(12) United States Patent
Yang et al.

(10) Patent No.: US 11,457,444 B2
(45) Date of Patent: Sep. 27, 2022

(54) SERVICE TRANSMISSION METHOD AND APPARATUS

(71) Applicant: GUANGDONG OPPO MOBILE TELECOMMUNICATIONS CORP., LTD., Guangdong (CN)

(72) Inventors: Ning Yang, Dongguan (CN); Yanan Lin, Dongguan (CN); Hai Tang, Dongguan (CN); Bin Feng, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 3 days.

(21) Appl. No.: 17/209,016

(22) Filed: Mar. 22, 2021

(65) Prior Publication Data
US 2021/0212061 A1 Jul. 8, 2021

Related U.S. Application Data

(63) Continuation of application No. 15/780,163, filed as application No. PCT/CN2016/112212 on Dec. 26, 2016, now Pat. No. 11,057,881.

(30) Foreign Application Priority Data

Feb. 5, 2016 (WO) ................ PCT/CN2016/073668

(51) Int. Cl.
*H04W 72/04* (2009.01)
*H04W 76/25* (2018.01)
(Continued)

(52) U.S. Cl.
CPC ....... *H04W 72/0446* (2013.01); *H04L 1/1819* (2013.01); *H04L 1/1854* (2013.01);
(Continued)

(58) Field of Classification Search
CPC .......... H04W 72/0446; H04W 52/146; H04W 72/04; H04W 72/042; H04W 72/048;
(Continued)

(56) References Cited

U.S. PATENT DOCUMENTS 8,750,095 B2   6/2014   Bashandy
8,750,875 B2   6/2014   Macias
(Continued)

FOREIGN PATENT DOCUMENTS

CN   101400093 A   4/2009
CN   101645764 A   2/2010
(Continued)

OTHER PUBLICATIONS

Correction of Notice of Allowance of the U.S. Appl. No. 15/780,163, dated Apr. 8, 2021.
(Continued)

*Primary Examiner* — Jae Y Lee
(74) *Attorney, Agent, or Firm* — Ladas & Parry, LLP

(57) ABSTRACT

A service transmission method and apparatus are provided. The method includes: a first mobile station acquiring N resource allocation parameter sets from a network device; the first mobile station sending first indication information to the network device, where the first indication information is used to indicate service information about a first service needing to be transmitted by the first mobile station; the first mobile station receiving second indication information sent by the network device, where the second indication information is used to indicate a first target resource; and the first mobile station determining, from the N resource allocation parameter sets, a first resource allocation parameter set adapted to the service information about the first service, and
(Continued)

the first mobile station transmitting, according to the first resource allocation parameter set, the first service using the first target resource.

16 Claims, 7 Drawing Sheets

(51) Int. Cl.
  *H04L 1/18* (2006.01)
  *H04W 72/12* (2009.01)
  *H04W 52/14* (2009.01)
  *H04W 72/14* (2009.01)
(52) U.S. Cl.
  CPC ......... *H04W 52/146* (2013.01); *H04W 72/04* (2013.01); *H04W 72/042* (2013.01); *H04W 72/048* (2013.01); *H04W 72/1257* (2013.01); *H04W 72/1268* (2013.01); *H04W 72/1278* (2013.01); *H04W 72/14* (2013.01); *H04W 76/25* (2018.02)
(58) Field of Classification Search
  CPC ......... H04W 72/1257; H04W 72/1268; H04W 72/1278; H04W 72/14; H04W 76/25; H04W 72/00; H04W 72/0493; H04W 72/1289; H04W 72/0413; H04L 1/1819; H04L 1/1854; H04L 5/0044; H04L 5/0053; H04L 5/0091
  See application file for complete search history.

(56) References Cited

U.S. PATENT DOCUMENTS

| | | | |
|---|---|---|---|
| 8,995,374 B2 | 3/2015 | Ciochina |
| 9,225,592 B2 | 12/2015 | Bashandy |
| 2006/0084432 A1 | 4/2006 | Balasubramanian |
| 2006/0245352 A1 | 11/2006 | Kang |
| 2010/0135166 A1 | 6/2010 | Ahluwalia |
| 2010/0322329 A1 | 12/2010 | Yoo |
| 2011/0085453 A1 | 4/2011 | Wu |
| 2011/0085620 A1 | 4/2011 | Measson |
| 2011/0243010 A1 | 10/2011 | Geirhofer |
| 2011/0256896 A1 | 10/2011 | Gerardo |
| 2011/0286419 A1 | 11/2011 | Cho |
| 2012/0106517 A1 | 5/2012 | Charbit |
| 2012/0142387 A1 | 6/2012 | Kano |
| 2012/0287896 A1 | 11/2012 | Kang |
| 2013/0010661 A1 | 1/2013 | Esteves |
| 2013/0051345 A1 | 2/2013 | Ciochina |
| 2013/0265975 A1 | 10/2013 | Shirani-Mehr |
| 2013/0273857 A1 | 10/2013 | Zhang |
| 2013/0294247 A1 | 11/2013 | Zhu |
| 2013/0308564 A1 | 11/2013 | Jain |
| 2013/0336152 A1 | 12/2013 | Zhu |
| 2013/0343176 A1 | 12/2013 | Bashandy |
| 2013/0343241 A1 | 12/2013 | Niu |
| 2014/0044029 A1 | 2/2014 | Chou et al. |
| 2014/0056278 A1 | 2/2014 | Marinier et al. |
| 2014/0057670 A1 | 2/2014 | Lim |
| 2014/0086155 A1 | 3/2014 | Chen |
| 2014/0094183 A1 | 4/2014 | Gao et al. |
| 2014/0105087 A1 | 4/2014 | Gupta |
| 2014/0105125 A1 | 4/2014 | Chaponniere et al. |
| 2014/0119255 A1 | 5/2014 | Vannithamby |
| 2014/0126487 A1 | 5/2014 | Chen |
| 2014/0146752 A1 | 5/2014 | Chen |
| 2014/0226542 A1 | 8/2014 | Gupta |
| 2014/0254490 A1 | 9/2014 | Jain |
| 2014/0286155 A1 | 9/2014 | Bashandy |
| 2014/0286296 A1 | 9/2014 | Tiirola et al. |
| 2014/0328329 A1 | 11/2014 | Novlan et al. |
| 2015/0009910 A1 | 1/2015 | Ryu et al. |
| 2015/0078305 A1 | 3/2015 | Wang et al. |
| 2015/0085805 A1 | 3/2015 | Li et al. |
| 2015/0180631 A1 | 6/2015 | Zhang |
| 2015/0215846 A1 | 7/2015 | Wang et al. |
| 2015/0215903 A1 | 7/2015 | Zhao et al. |
| 2015/0270868 A1 | 9/2015 | Park |
| 2015/0304960 A1 | 10/2015 | Yang |
| 2015/0327315 A1 | 11/2015 | Xue et al. |
| 2016/0094372 A1* | 3/2016 | Jitsukawa ........... H04L 27/2613 375/322 |
| 2016/0095074 A1 | 3/2016 | Park et al. |
| 2016/0135187 A1 | 5/2016 | Cui et al. |
| 2016/0192435 A1 | 6/2016 | Gupta et al. |
| 2016/0211956 A9 | 7/2016 | Chen |
| 2016/0338094 A1 | 11/2016 | Faurie et al. |
| 2016/0338095 A1 | 11/2016 | Faurie et al. |
| 2017/0230959 A1 | 8/2017 | Wu et al. |
| 2017/0238288 A1 | 8/2017 | Chen et al. |
| 2017/0295554 A1 | 10/2017 | Lee et al. |
| 2018/0160418 A1* | 6/2018 | Luo ..................... H04W 72/048 |
| 2018/0192407 A1 | 7/2018 | Chen et al. |
| 2018/0227882 A1 | 8/2018 | Freda et al. |
| 2019/0124669 A1 | 4/2019 | Luo et al. |

FOREIGN PATENT DOCUMENTS

| | | |
|---|---|---|
| CN | 101754268 A | 6/2010 |
| CN | 101932039 A | 12/2010 |
| CN | 101932112 A | 12/2010 |
| CN | 102026410 A | 4/2011 |
| CN | 102056174 A | 5/2011 |
| CN | 102196570 A | 9/2011 |
| CN | 102282796 A | 12/2011 |
| CN | 102308651 A | 1/2012 |
| CN | 102769922 A | 11/2012 |
| CN | 102986159 A | 3/2013 |
| CN | 103298130 A | 9/2013 |
| CN | 103327568 A | 9/2013 |
| CN | 103686861 A | 3/2014 |
| CN | 103843444 A | 6/2014 |
| CN | 104301273 A | 1/2015 |
| CN | 104540236 A | 4/2015 |
| CN | 104640159 A | 5/2015 |
| CN | 104754748 A | 7/2015 |
| CN | 104796187 A | 7/2015 |
| CN | 104811909 A | 7/2015 |
| CN | 105099639 A | 11/2015 |
| CN | 105101430 A | 11/2015 |
| CN | 105282846 A | 1/2016 |
| EP | 2056527 A1 | 5/2009 |
| EP | 2165558 A2 | 3/2010 |
| EP | 2265070 A1 | 12/2010 |
| EP | 2887730 A1 | 6/2015 |
| JP | 2015012405 A | 1/2015 |
| JP | 2016503636 A | 2/2016 |
| JP | 2017515399 A | 6/2017 |
| WO | 2006044714 A1 | 4/2006 |
| WO | 2015062020 A1 | 5/2015 |
| WO | 2015062542 A1 | 5/2015 |
| WO | 2015122701 A1 | 8/2015 |
| WO | 2015129578 A1 | 9/2015 |
| WO | 2015131730 A1 | 9/2015 |
| WO | 2015137208 A1 | 9/2015 |
| WO | 2015147376 A1 | 10/2015 |
| WO | 2015167096 A1 | 11/2015 |
| WO | 2015178566 A1 | 11/2015 |
| WO | 2016003140 A1 | 1/2016 |
| WO | 2016181095 A1 | 11/2016 |

OTHER PUBLICATIONS

Correction of Notice of Allowance of the U.S. Appl. No. 15/780,163, dated Jun. 1, 2021.
Beijing Xinwei Telecom Techn., Discussion on enhancement of V2X resource allocation, 3GPP TSG-RAN WG1#83 R1-156498, 3GPP, Nov. 6, 2015.
CATT, Consideration on design for eNB scheduling PC5 V2V, 3GPP TSG-RAN WG1#83 R1-156608, 3GPP, Nov. 7, 2015.

(56) References Cited

OTHER PUBLICATIONS

Second Office Action of the Japanese application No. 2018-532175, dated Jun. 25, 2021.
Supplementary European Search Report in the European application No. 20216459.6, dated Apr. 30, 2021.
Notice of Allowance of the U.S. Appl. No. 15/780,202, dated Oct. 26, 2021.
Final Office Action of the U.S. Appl. No. 15/780,202, dated Apr. 14, 2021.
Written Opinion of the International Search Authority in the international application No. PCT/CN2016/112212, dated Mar. 15, 2017.
Written Opinion of the International Search Authority in the international application No. PCT/CN2016/111835, dated Mar. 8, 2017.
Written Opinion of the International Search Authority in the international application No. PCT/CN2016/112214, dated Mar. 24, 2017.
Written Opinion of the International Search Authority in the international application No. PCT/CN2016/112215, dated Mar. 24, 2017.
Written Opinion of the International Search Authority in the international application No. PCT/CN2016/073668, dated Nov. 8, 2016.
Supplementary European Search Report in European application No. 16889158.8, dated Apr. 15, 2019.
Supplementary European Search Report, in European application No. 16889151.3, dated May 31, 2019.
International Search Report in the international application No. PCT/CN2016/112212, dated Mar. 15, 2017.
International Search Report in the international application No. PCT/CN2016/111835, dated Mar. 8, 2017.
International Search Report in the international application No. PCT/CN2016/112214, dated Mar. 24, 2017.
International Search Report in the international application No. PCT/CN2016/112215, dated Mar. 24, 2017.
International Search Report in the international application No. PCT/CN2016/073663, dated Nov. 8, 2016.
First. Office Action of the Chinese application No. 201680057833.9, dated Aug. 22, 2019.
First Office Action of the Chinese application No. 201680067025.0, dated Aug. 9, 2019.
Second Office Action of the Chinese application No. 201680067025.0, dated Nov. 5, 2019.
LG Electronics Inc."Emall discussion—[91 bis#36][LTE/2X] Latency analysis"; 3GPP TSG-RAN WG2 #92 draft R2-156505 Anaheim, CA, USA, Nov. 16-20, 2015, entire document.
Office Action of the Taiwanese application No. 106103777, dated Jul. 13, 2020.
Office Action of the Taiwanese application No. 106103401, dated Aug. 6, 2020.
Office Action of the Taiwanese application No. 106103776, dated Jul. 17, 2020.
Office Action of the Taiwanese application No. 106103759, dated Jul. 21, 2020.
Office Action of the Taiwanese application No. 106103758, dated Jul. 21, 2020.
Office Action of the Indian application No. 201817032047, dated Jul. 29, 2020.
Second Office Action of the Canadian application No. 3007513, dated Jul. 29, 2020.
First Office Action of the European application No. 16889158.8, dated Sep. 23, 2020.
Office Action of the Indian application No. 201817031348, dated Sep. 17, 2020.
First Office Action of the Brazilian application No. 1120180143944, dated Sep. 29, 2020.
Office Action of the Australian application No. 2016391021, dated Oct. 12, 2020.
Huawei, Hisilicon, Procedure for Service Authorization, 3GPP TSG-SA WG2#113 S2-160318, 3GPP, Jan. 19, 2016, entire document.
Second Office Action of the Australian application No. 2016391021, dated Jan. 5, 2021.
First Office Action of the Japanese application No. 2018-532175, dated Jan. 15, 2021.
Non-Final Office Action of the U.S. Appl. No. 15/780,202, dated Dec. 28, 2020.
Notice of re-examination of the Chinese application No. 201680057833.9, dated Oct. 30, 2020.
Non-Final Office Action of the U.S. Appl. No. 15/780,163, dated Oct. 24, 2019.
Final Office Action of the U.S. Appl. No. 15/780,163, dated Mar. 30, 2020.
Non-Final Office Action of the U.S. Appl. No. 15/780,163, dated Aug. 20, 2020.
Notice of Allowance of the U.S. Appl. No. 15//80,163, dated Dec. 24, 2020.
Notice of Allowance of the U.S. Appl. No. 15/780,163, dated Feb. 18, 2021.
First Office Action of the Japanese application No. 2018-529222, dated Jan. 26, 2021.
ZTE, Enhancement of resource allocation and procedure for V2V, 3GPP TSG-RAN WG1#83 R1-156659; Nov. 22, 2015, entire document.
First Office Action of the Canadian application No. 3007513, dated May 3, 2019.
Advisory Action of the U.S. Appl. No. 15/780,163, dated Jun. 11, 2020.
Notice of Allowance of the Chinese Application No. 201680067025.0, dated Jan. 21, 2020.
Second Office Action of the Chinese application No. 201680057833.9, dated Oct. 31, 2019.
Notice of Rejection of the Chinese application No. 201680057833.9, dated Jan. 15, 2020.

* cited by examiner

200

A first MS acquires N resource allocation parameter sets from a network device, each resource allocation parameter set includes at least one resource allocation parameter, and N≥2 — S210

The first MS sends first indication information to the network device, the first indication information indicates service information of a first service to be transmitted by the first MS, so as for the network device to determine a first resource allocation parameter set adapted to the service information of the first service from the N resource allocation parameter sets — S220

The first MS receives second indication information sent by the network device, the second indication information indicates a first target resource — S230

The first MS determines the first resource allocation parameter set adapted to the service information of the first service in the N resource allocation parameter sets, and transmits the first service with the network device using the first target resource according to the first resource allocation parameter set — S240

FIG. 2

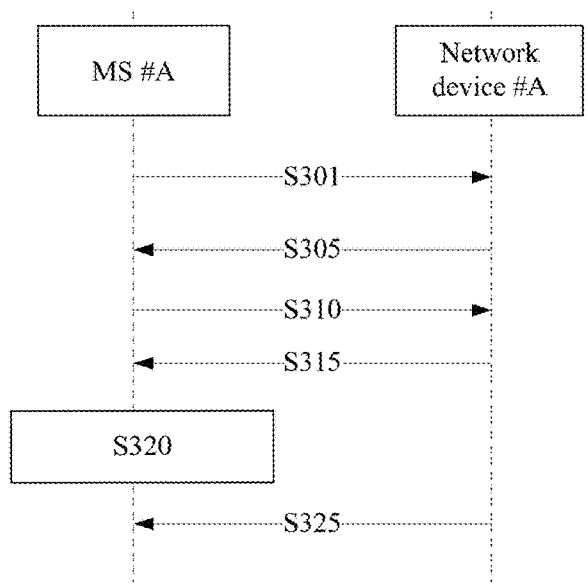

S410: A first MS acquires N resource allocation parameter sets, each resource allocation parameter set includes at least one resource allocation parameter, and N≥2.

S420: The first MS determines a second resource allocation parameter set adapted to a service type of a second service from the N resource allocation parameter sets according to the service type of the second service, and the first MS determines a second target resource S430: The first MS sends indication information of the second resource allocation parameter set and indication information of the second target resource to a second MS S440: The first MS transmits the second service with the second MS using the second target resource according to the second resource allocation parameter set

FIG. 4

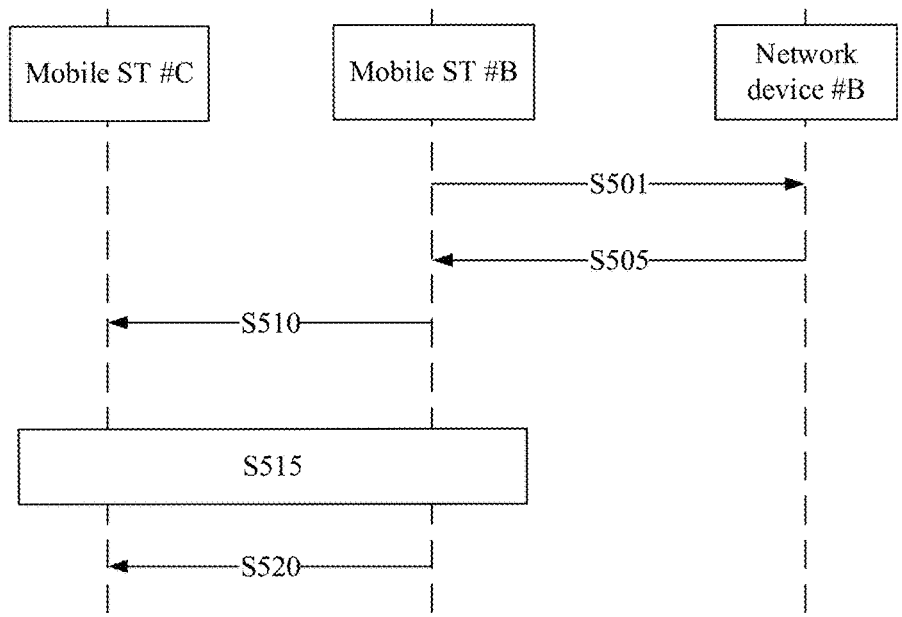

```
┌─────────────────────────────────────────────────┐
│ Network device issues N resource allocation     │
│ parameter sets to a first MS, wherein each      │── S610
│ resource allocation parameter set includes at   │
│ least one resource allocation parameter, and    │
│ N≥2                                             │
└─────────────────────────────────────────────────┘
                        ▼
┌─────────────────────────────────────────────────┐
│ The network device receives first indication    │
│ information sent by the first MS, the first     │── S620
│ indication information indicates service        │
│ information of a first service to be            │
│ transmitted by the first MS                     │
└─────────────────────────────────────────────────┘
                        ▼
┌─────────────────────────────────────────────────┐
│ The network device determines a first resource  │
│ allocation parameter set adapted to the service │── S630
│ information of the first service from the N     │
│ resource allocation parameter sets according    │
│ to the first indication information             │
└─────────────────────────────────────────────────┘
                        ▼
┌─────────────────────────────────────────────────┐
│ The network device determines a first target    │
│ resource and sends second indication            │── S640
│ information indicating the first target         │
│ resource to the first MS                        │
└─────────────────────────────────────────────────┘
```

```
┌─────────────────────────────────────────────────┐
│ A second MS receives indication information of  │
│ a second resource allocation parameter set and  │
│ indication information of a second target       │
│ resource from a first MS, the second            │── S710
│ resource allocation parameter set is determined │
│ from N resource allocation parameter sets by    │
│ the first MS according to a service type of a   │
│ second service and N≥2                          │
└─────────────────────────────────────────────────┘
                        ▼
┌─────────────────────────────────────────────────┐
│ The second MS transmits the second service      │
│ with the first MS using the second target       │── S720
│ resource according to the second resource       │
│ allocation parameter set                        │
└─────────────────────────────────────────────────┘
```

FIG. 7

SERVICE TRANSMISSION METHOD AND APPARATUS

CROSS-REFERENCE TO RELATED APPLICATIONS

The present disclosure is a U.S. continuation application of U.S. application Ser. No. 15/780,163, filed on May 30, 2018, which is a US national phase application based upon an International Application No. PCT/CN2016/112212, filed on Dec. 26, 2016, which claims priority to PCT Patent Application No. PCT/CN2016/073668, filed before the Patent Office of the People's Republic of China on Feb. 5, 2016 and named after "service transmission method and apparatus", the entire contents of the above applications are hereby incorporated by reference in their entirety.

TECHNICAL FIELD

The disclosure relates to the field of communications, and more particularly to a service transmission method and apparatus.

BACKGROUND

Along with development of a communication technology, multiple scheduling manners have been provided, for example, dynamic scheduling, persistent scheduling and Semi-Static Scheduling (SPS).

SPS may also be referred to as semi-persistent scheduling, that is, resources are allocated to users according to a certain period, so that resource allocation in the period is not required to be indicated by scheduling signaling. Compared with dynamic scheduling, such a scheduling manner is relatively poorer in flexibility but relatively lower in control signaling overhead, and thus is suitable for services with an unobvious burst characteristic and a guaranteed rate requirement, for example, the Voice over Internet Protocol (VoIP) service or the Voice over Long Term Evolution (VoLTE) service.

Along with popularization and development of the communication technology, more and more SPS-based services may be provided for users, and thus there may be the condition that different services have different SPS requirements.

How to flexibly and rapidly deal with different requirements of different services on SPS becomes a problem urgent to be solved in the industry.

SUMMARY

The disclosure provides a service transmission method and apparatus, which can flexibly and rapidly deal with different requirements of different services on SPS.

A first aspect provides a service transmission method, which may include that: a first mobile Station (MS) acquires N resource allocation parameter sets from a network device, wherein each of the N resource allocation parameter sets may include at least one resource allocation parameter, and N is no less than 2; the first MS sends first indication information to the network device, wherein the first indication information indicates service information of a first service to be transmitted (i.e., sent and/or received) by the first MS; the first MS receives second indication information sent by the network device, the second indication information indicates a first target resource; and the first MS determines a first resource allocation parameter set adapted to the service information of the first service from the N resource allocation parameter sets, and the first MS transmits the first service with (i.e., sends the first service to and/or receives the first service from) the network device using the first resource allocation parameter set and the first target resource.

In combination with the first aspect, in a first implementation mode of the first aspect, the first target resource may be allocated to the first MS by the network device according to at least one of the service information of the first service or the first resource allocation parameter set.

In combination with the first aspect and the abovementioned implementation mode thereof, in a second implementation mode of the first aspect, the operation that the first MS acquires the N resource allocation parameter sets from the network device may include that: the first MS acquires a mapping between the N resource allocation parameter sets and M service information from the network device, wherein M is no less than N, and each of the M service information may correspond to a resource allocation parameter set; and the operation that the first MS determines the first resource allocation parameter set adapted to the service information of the first service from the N resource allocation parameter sets may include that: the first MS determines the first resource allocation parameter set adapted to the service information of the first service from the N resource allocation parameter sets according to the mapping between the N resource allocation parameter sets and the M service information and the service information of the first service.

In combination with the first aspect and the abovementioned implementation modes thereof, in a third implementation mode of the first aspect, the method may further include that: the first MS receives third indication information sent by the network device, wherein the third indication information indicates the first MS to transmit the first service using the first resource allocation parameter set; and the operation that the first MS determines the first resource allocation parameter set adapted to the service information of the first service from the N resource allocation parameter sets may include that: the first MS determines the first resource allocation parameter set adapted to the service information of the first service from the N resource allocation parameter sets according to the third indication information.

In combination with the first aspect and the abovementioned implementation modes thereof, in a fourth implementation mode of the first aspect, the operation that the first MS receives the third indication information sent by the network device may include that: the first MS receives the third indication information sent by the network device through a downlink control channel.

In combination with the first aspect and the abovementioned implementation modes thereof, in a fifth implementation mode of the first aspect, the operation that the first MS receives the third indication information sent by the network device through the downlink control channel may include that: the first MS receives the third indication information through a first reserved resource in the downlink control channel; or the first MS determines a first preset format and takes information in the first preset format in the downlink control channel as the third indication information; or the first MS determines a first preset Radio Network Temporary Identity (RNTI) and takes information containing the first preset RNTI in the downlink control channel as the third indication information.

In combination with the first aspect and the abovementioned implementation modes thereof, in a sixth implementation mode of the first aspect, the operation that the first MS acquires the N resource allocation parameter sets from the network device may include that: the first MS acquires a one-to-one mapping between the N resource allocation parameter sets and N index identifiers from the network device, the third indication information including an index identifier corresponding to the first resource allocation parameter set.

In combination with the first aspect and the abovementioned implementation modes thereof, in a seventh implementation mode of the first aspect, the index identifier may include a number or an RNTI.

In combination with the first aspect and the abovementioned implementation modes thereof, in an eighth implementation mode of the first aspect, before the operation that the first MS acquires the N resource allocation parameter sets from the network device, the method may further include that: the first MS reports T (i.e., T pieces of) service information which are supported by the first MS to the network device, so as for the network device to determine and issue the N resource allocation parameter sets to the MS according to the T service information, wherein T is no less than N, and each of the T service information may correspond to a resource allocation parameter set.

In combination with the first aspect and the abovementioned implementation modes thereof, in a ninth implementation mode of the first aspect, before the operation that the first MS reports the T service information which are supported by the first MS to the network device, the method may further include that: the first MS acquires information of a first mapping relationship, wherein the information of the first mapping relationship may indicate service information of each of multiple services, wherein the first mapping relationship may be the same as a second mapping relationship, and information of the second mapping relationship may be information used when the network device determines the service information of each of the multiple services; and the first MS determines the T service information corresponding to K services which are supported by the first MS according to the information of the first mapping relationship, wherein K is no less than T.

In combination with the first aspect and the abovementioned implementation modes thereof, in a tenth implementation mode of the first aspect, the operation that the first MS reports T service types which are supported by the first MS to the network device may include that: the first MS reports the T service types which are supported by the first MS to the network device through Access Stratum (AS) signaling; or the first MS reports the T service types which are supported by the first MS to the network device through Non-Access Stratum (NAS) signaling.

In combination with the first aspect and the abovementioned implementation modes thereof, in an eleventh implementation mode of the first aspect, the operation that the first MS reports the T service information which are supported by the first MS to the network device may include that: the first MS reports the T service information which are supported by the first MS to the network device through AS signaling; or the first MS reports the T service information which are supported by the first MS to the network device through NAS signaling.

In combination with the first aspect and the abovementioned implementation modes thereof, in a twelfth implementation mode of the first aspect, the operation that the first MS sends the first indication information to the network device may include that: the first MS sends a data packet containing the first indication information to the network device through an uplink data channel, wherein the first indication information may be carried in a Media Access Control (MAC) layer of the data packet; or the first MS sends the first indication information to the network device through an uplink control channel; or the first MS sends the first indication information to the network device through Radio Resource Control (RRC) signaling.

In combination with the first aspect and the abovementioned implementation modes thereof, in a thirteenth implementation mode of the first aspect, the method may further include that: the first MS receives fourth indication information sent by the network device, wherein the fourth indication information indicates the first MS to stop transmitting the service with the first resource allocation parameter set; and the first MS stops transmitting the service with the first resource allocation parameter set according to the fourth indication information.

In combination with the first aspect and the abovementioned implementation modes thereof, in a fourteenth implementation mode of the first aspect, the operation that the first MS receives the fourth indication information sent by the network device may include that: the first MS receives the fourth indication information sent by the network device through the downlink control channel.

In combination with the first aspect and the abovementioned implementation modes thereof, in a fifteenth implementation mode of the first aspect, the operation that the first MS receives the fourth indication information sent by the network device through the downlink control channel may include that: the first MS receives the fourth indication information through a second reserved resource in the downlink control channel; or the first MS determines a second preset format and takes information in the second preset format in the downlink control channel as the fourth indication information; or the first MS determines a second preset RNTI and takes information containing the second preset RNTI in the downlink control channel as the fourth indication information.

In combination with the first aspect and the abovementioned implementation modes thereof, in a sixteenth implementation mode of the first aspect, the resource allocation parameter in each of the N resource allocation parameter sets may include at least one of the following parameters: a transmission periodicity, a receiving periodicity, an uplink power control parameter or a number of hybrid automatic repeat request (HARM) processes.

In combination with the first aspect and the abovementioned implementation modes thereof, in a seventeenth implementation mode of the first aspect, the method may further include that: the first MS avoids transmitting the service with a resource allocation parameter set other than the first resource allocation parameter set in a period for transmitting the first service.

In combination with the first aspect and the abovementioned implementation modes thereof, in an eighteenth implementation mode of the first aspect, the N service types may include a basic service type, and a resource allocation parameter set corresponding to the basic service type may include all parameters for periodic-scheduling-based service transmission.

In combination with the first aspect and the abovementioned implementation modes thereof, in a nineteenth implementation mode of the first aspect, when the first resource allocation parameter set includes part of the parameters for periodic-scheduling-based service transmission, the operation that the first MS transmits the first service using the first target resource according to the first resource allocation parameter set may include that: the first MS transmits the first service with the first resource allocation parameter set, the resource allocation parameter set corresponding to the basic service type, and the first target resource.

In combination with the first aspect and the abovementioned implementation modes thereof, in a twentieth implementation mode of the first aspect, the operation that the first MS acquires the N resource allocation parameter sets from the network device may include that: the first MS receives n configuration information carrying the N resource allocation parameter sets from the network device, wherein each piece of configuration information may carry at least one of the N resource allocation parameter sets, N is no less than n, and n is no less than 1.

A second aspect provides a service resource method, which may include that: a network device issues N resource allocation parameter sets to a first MS, wherein each of the N resource allocation parameter sets may include at least one resource allocation parameter, and N is no less than 2; the network device receives first indication information sent by the first MS, the first indication information indicates service information of a first service to be transmitted by the first MS; the network device determines a first resource allocation parameter set adapted to the service information of the first service from the N resource allocation parameter sets according to the first indication information; the network device determines a first target resource and sends second indication information indicating the first target resource to the first MS; and the network device transmits the first service with the first MS using the first resource allocation parameter set and the first target resource.

In combination with the second aspect, in a first implementation mode of the second aspect, the operation that the network device determines the first target resource may include that: the network device determines the first target resource according to at least one of the service information of the first service or the first resource allocation parameter set.

In combination with the second aspect and the abovementioned implementation mode thereof, in a second implementation mode of the second aspect, the operation that the network device issues the N resource allocation parameter sets to the first MS may include that: the network device issues a mapping between the N resource allocation parameter sets and M service information to the first MS, wherein M is no less than N, and each of the M service information may correspond to a resource allocation parameter set.

In combination with the second aspect and the abovementioned implementation modes thereof, in a third implementation mode of the second aspect, the method may further include that: the network device sends third indication information to the first MS, wherein the third indication information indicates the first MS to transmit the first service using the first resource allocation parameter set.

In combination with the second aspect and the abovementioned implementation modes thereof, in a fourth implementation mode of the second aspect, the operation that the network device sends the third indication information to the first MS may include that: the network device sends the third indication information to the first MS through a downlink control channel. In combination with the second aspect and the abovementioned implementation modes thereof, in a fifth implementation mode of the second aspect, the operation that the network device sends the third indication information to the first MS through the downlink control channel may include that: the network device sends the third indication information to the first MS through a first reserved resource in the downlink control channel; or the network device determines a first preset format and generates and sends the third indication information according to the first preset format; or the network device determines a first preset RNTI and contains the first preset RNTI in the third indication information for sending to the first MS.

In combination with the second aspect and the abovementioned implementation modes thereof, in a sixth implementation mode of the second aspect, the operation that the network device issues the N resource allocation parameter sets to the first MS may include that: the network device issues a one-to-one mapping between the N resource allocation parameter sets and N index identifiers to the first MS, the third indication information including the index identifier corresponding to the first resource allocation parameter set.

In combination with the second aspect and the abovementioned implementation modes thereof, in a seventh implementation mode of the second aspect, the index identifier may include a number or an RNTI.

In combination with the second aspect and the abovementioned implementation modes thereof, in an eighth implementation mode of the second aspect, before the operation that the network device issues the N resource allocation parameter sets to the first MS, the method may further include that: the network device acquires T service information which are supported by the first MS from the first MS; and the network device determines the N resource allocation parameter sets according to the T service information, wherein T is no less than N, and each of the T service information may correspond to a resource allocation parameter set.

In combination with the second aspect and the abovementioned implementation modes thereof, in a ninth implementation mode of the second aspect, the operation that the network device acquires the T service information which are supported by the first MS from the first MS may include that: the network device acquires the T service information, which are supported by the first MS, reported by the first MS through AS signaling; or the network device acquires the T service information, which are supported by the first MS, reported by the first MS through NAS signaling.

In combination with the second aspect and the abovementioned implementation modes thereof, in a tenth implementation mode of the second aspect, the operation that the network device receives the first indication information sent by the first MS may include that: the network device receives the first indication information sent by the first MS through an uplink data channel, wherein the first indication information may be carried in a MAC layer of a data packet; or the network device receives the first indication information sent by the first MS through an uplink control channel; or the network device receives the first indication information sent by the first MS through RRC signaling.

In combination with the second aspect and the abovementioned implementation modes thereof, in an eleventh implementation mode of the second aspect, the method may further include that: the network device sends fourth indication information to the first MS, wherein the fourth indication information indicates the first MS to stop transmitting the service with the first resource allocation parameter set.

In combination with the second aspect and the abovementioned implementation modes thereof, in a twelfth implementation mode of the second aspect, the resource allocation parameter in each of the N resource allocation parameter sets may include at least one of the following parameters: a transmission periodicity, a receiving periodicity, an uplink power control parameter, or a number of HARQ processes.

In combination with the second aspect and the above-mentioned implementation modes thereof, in a thirteenth implementation mode of the second aspect, the operation that the network device issues the N resource allocation parameter sets to the first MS may include that: the network device sends n configuration information carrying the N resource allocation parameter sets to the first MS, wherein each piece of configuration information may carry at least one of the N resource allocation parameter sets, N is no less than n, and n is no less than 1.

In combination with the second aspect and the above-mentioned implementation modes thereof, in a fourteenth implementation mode of the second aspect, the method may further include that: the network device acquires information of a second mapping relationship, wherein the information of the second mapping relationship may indicate service information of each of multiple services, wherein the second mapping relationship may be the same as a first mapping relationship, and information of the first mapping relationship may be information used when the first MS determines the service information of each of the multiple services.

A third aspect provides a service transmission apparatus, which includes units or modules configured to implement the first aspect and each implementation mode of the first aspect.

A fourth aspect provides a service transmission apparatus, which includes units or modules configured to implement the second aspect and each implementation mode of the second aspect.

A fifth aspect provides a computer program product, which includes computer program codes, the computer program codes being run by a receiving unit, processing unit and sending unit or receiver, processor and sender of a MS to enable the MS to execute the service transmission method according to any of the first aspect and various implementation modes thereof.

A sixth aspect provides a computer program product, which includes a computer program codes, the computer program codes being run by a receiving unit, processing unit and sending unit or receiver, processor and sender of a network device to enable the network device to execute the service transmission method in according to any of the second aspect and various implementation modes thereof.

A seventh aspect provides a computer-readable storage medium, which stores a program, the program enabling a MS to execute any service transmission method in the first aspect and various implementation modes thereof.

An eighth aspect provides a computer-readable storage medium, which stores a program, the program enabling a network device to execute any service transmission method in the second aspect and various implementation modes thereof.

According to the service transmission method and apparatus of embodiments of the disclosure, the first MS negotiates with the network device to determine multiple resource allocation parameter sets in advance, the multiple resource allocation parameter sets correspond to multiple SPS manners respectively, and when the first MS and the network device are required to transmit the first service, the first MS and the network device may determine the first resource allocation parameter set corresponding to a service type of the first service from the multiple (N) resource allocation parameter sets according to the service type of the first service and transmit the first service according to the first resource allocation parameter set, so as to flexibly and rapidly deal with different requirements of different services on SPS.

BRIEF DESCRIPTION OF DRAWINGS

In order to describe the technical solutions of the embodiments of the disclosure more clearly, the drawings to be used in the embodiments of the disclosure will be simply introduced below. Obviously, the drawings described below are only some embodiments of the disclosure. Other drawings may further be obtained by those of ordinary skilled in the art according to these drawings without creative work.

FIG. 2 illustrates a schematic flowchart of an example of a service transmission method according to an embodiment of the disclosure.

FIG. 3 illustrates a schematic interaction diagram of an example of a service transmission method according to an embodiment of the disclosure.

FIG. 4 illustrates a schematic flowchart of another example of a service transmission method according to an embodiment of the disclosure.

FIG. 5 illustrates a schematic interaction diagram of another example of a service transmission method according to an embodiment of the disclosure.

FIG. 6 illustrates a schematic flowchart of another example of a service transmission method according to an embodiment of the disclosure.

FIG. 7 illustrates a schematic flowchart of another example of a service transmission method according to an embodiment of the disclosure.

DETAILED DESCRIPTION

Figure 1:
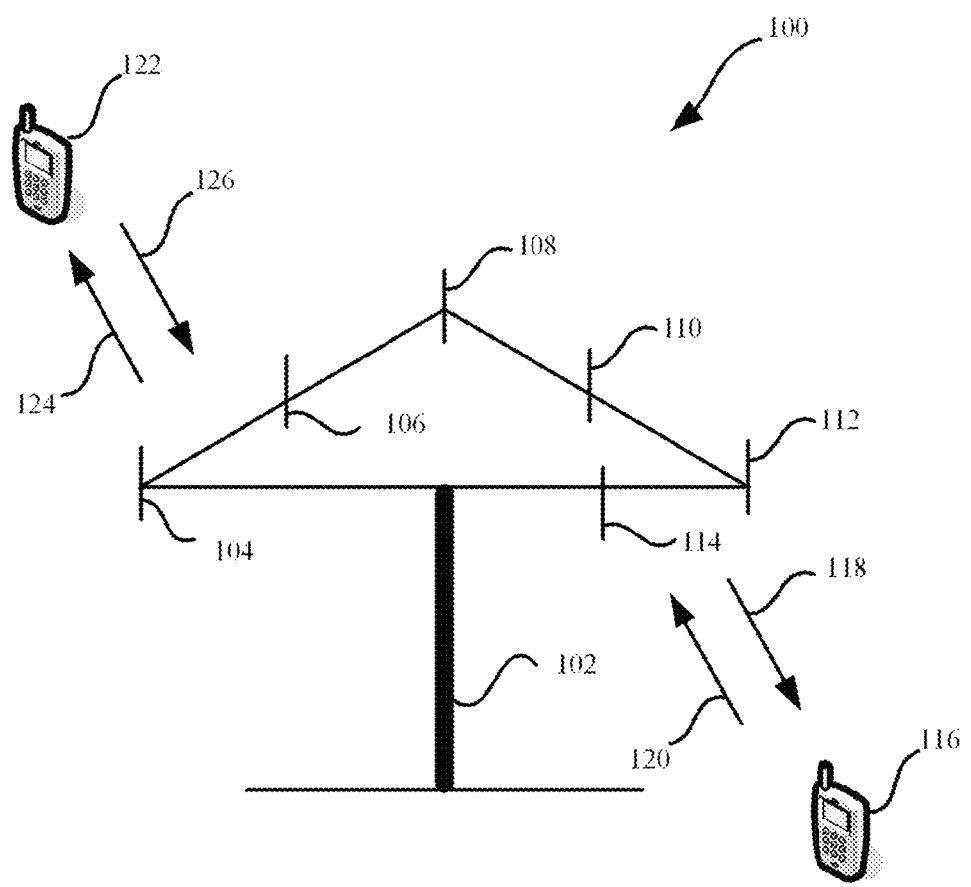
FIG. 1 illustrates a schematic diagram of an example of a communication system suitable for using a service transmission method according to an embodiment of the disclosure.

The technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those of ordinary skilled in the art on the basis of the embodiments in the disclosure without creative work shall fall within the scope of protection of the disclosure.

Terms "part", "module", "system" and the like used in the specification are adopted to represent a computer related entity, hardware, firmware, hardware and software combination, software or software in execution. For example, a part may be, but not limited to, a process running on a processor, the processor, an object, an executable file, an execution thread, a program and/or a computer. The drawings show that an application running on a computing device and the computing device may both be parts. One or more parts may reside in a process and/or an execution thread, and the parts may be located on a computer and/or distributed between two or more computers. In addition, these parts may be executed from various computer-readable media with various data structures stored thereon. The parts may transmit through local and/or remote processes according to signals with one or more data groups (for example, data from two parts interacting with another part of a local system, a distributed system and/or a network, for example, the Internet interacting with another system through a signal).

The solutions of the embodiments of the disclosure may be applied to an existing cellular communication system, for example, systems of a Global System for Mobile Communication (GSM), Wideband Code Division Multiple Access (WCDMA) and Long Term Evolution (LTE), and supported communication mainly includes voice and data communication. Connections supported by a conventional base station are usually limited in number and easy to implement.

A next-generation mobile communication system will not only support conventional communication, but also support Machine to Machine (M2M) communication, or referred to as Machine Type Communication (MTC). It is predicted that, by 2020, MTC devices connected to networks will reach 500 to 1,000 hundred million, which will be far larger than an existing connection number. M2M services have greatly different network requirements due to their greatly different service types. There may roughly be the following requirements:

reliable transmission but insensitivity to delay; and
low delay and high-reliability transmission.

It is easier to process a reliable-transmission delay-insensitive service. However, a service of a low-delay and highly-reliable transmission type not only requires a short transmission delay but also requires reliability, for example, a Vehicle to Vehicle (V2V) service or a Vehicle to Everything (V2X) service. Unreliable transmission may cause retransmission and an excessively long transmission delay and may not meet the requirements.

Existence of a large number of connections makes a future wireless communication system greatly different from an existing communication system. A large number of connections require more resources to be consumed in accessing a terminal device and require more resources to be consumed in transmission of scheduling signaling related to data transmission of the terminal device. The solutions according to the embodiments of the disclosure may effectively solve the resource consumption problem.

Alternatively, a network device is a base station, and a MS is User Equipment (UE).

Each embodiment of the disclosure is described in combination with a MS. The MS may also be referred to as UE, a terminal device, an access terminal, a user unit, a user station, a mobile radio station, a remote station, a remote terminal, a mobile device, a user terminal, a terminal, wireless communication devices, a user agent or a user device. The MS may be a station in a Wireless Local Area Network (WLAN), and may be a cell phone, a cordless phone, a Session Initiation Protocol (SIP) phone, a Wireless Local Loop (WLL) station, a Personal Digital Assistant (PDA), a handheld device with a wireless communication function, a computing device, other processing device connected to a wireless modem, a vehicle-mounted device, a wearable device, a MS in a future 5th-Generation (5G) network, a MS in a future evolved Public Land Mobile Network (PLMN) or the like.

In addition, each embodiment of the disclosure is described in combination with a network device. The network device may be a device configured to transmit with the MS, and the network device may be an Access Point (AP) in the WLAN, a Base Transceiver Station (BTS) in a Global System for Mobile Communication (GSM) or Code Division Multiple Access (CDMA), may also be allodeB (NB) in WCDMA, and may further be an Evolutional Node B (eNB or eNodeB) in LTE, or a relay station or AP, or a vehicle-mounted device, a wearable device, a network device in the future 5G network, a network device in the future evolved PLMN or the like.

In addition, each aspect or characteristic of the disclosure may be implemented into a method, a device or a product programed with a standard and/or using an engineering technology. Term "product" used in the application covers a computer program which may be accessed from any computer-readable device, carrier or medium. For example, the computer-readable medium may include, but not limited to: a magnetic storage device (for example, a hard disk, a floppy disk or a magnetic tape), an optical disk (for example, a Compact Disk (CD), a Digital Versatile Disk (DVD)), a smart card and a flash memory (for example, an Erasable Programmable Read-Only Memory (EPROM), a card, a stick or a key driver). In addition, various storage media described in the disclosure may represent one or more devices and/or other machine-readable media configured to store information. Term "machine-readable medium" may include, but not limited to, a wireless channel and various other media capable of storing, including and/or carrying instructions and/or data.

FIG. 1 illustrates a schematic diagram of an information transmission communication system according to the disclosure. As illustrated in FIG. 1, the communication system 100 includes a network device 102, and the network device 102 may include multiple antennae, for example, antennae 104, 106, 108, 110, 112 and 114. In addition, the network device 102 may additionally include a sender chain and a receiver chain. Those of ordinary skilled in the art may know that all of them may include multiple parts (for example, a processor, a modulator, a multiplexer, a demodulator, a demultiplexer or an antenna) related to signal sending and receiving.

The network device 102 may communicate with multiple terminal devices (for example, a terminal device 116 and a terminal device 122). However, it can be understood that the network device 102 may communicate with any amount of terminal devices like the terminal device 116 or 122. The terminal device 116 and 122 may be, for example, cell phones, smart phones, portable computers, handheld communication devices, a handheld computing device, satellite radio devices, global positioning systems, PDAs and/or any other proper device configured for communication on the wireless communication system 100.

As illustrated in FIG. 1, the terminal device 116 communicates with the antennae 112 and 114, wherein the antennae 112 and 114 send information to the terminal device 116 through a forward link 118 and receive information from the terminal device 116 through a reverse link 120. In addition, the terminal device 122 communicates with the antennae 104 and 106, wherein the antennae 104 and 106 send information to the terminal device 122 through a forward link 124 and receive information from the terminal device 122 through a reverse link 126.

For example, in a Frequency Division Duplex (FDD) system, for example, the forward link 118 may use a frequency band different from that used by the reverse link 120, and the forward link 125 may use a frequency band different from that used by the reverse link 126.

For another example, in a Time Division Duplex (TDD) system and a full duplex system, the forward link 118 and the reverse link 120 may use the same frequency band, and the forward link 124 and the reverse link 126 may use the same frequency band.

Each antenna (or antenna group formed by multiple antennae) and/or region designed for communication are/is referred to as sectors/a sector of the network device 102. For example, the antenna group may be designed to communicate with a terminal device in a sector of coverage area of the network device 102. In a process that the network device 102 communicates with the terminal device 116 and 122 through the forward links 118 and 124 respectively, a sending antenna of the network device 102 may use beamforming to improve signal noise ratios of the forward links 118 and 124. In addition, compared with a manner that the network device sends signals to all its a terminal device through a single antenna, when the network device 102 sends signals to the terminal device 116 and 122 randomly scattered in the related coverage area using beamforming, a mobile device in an adjacent cell may be interfered less.

In a given time, the network device 102, the terminal device 116 or the terminal device 122 may be a wireless communication sending device and/or a wireless communication receiving device. When data is sent, the wireless communication sending device may code the data for transmission. Specifically, the wireless communication sending device may acquire (for example, generation, receiving from another communication device or storage in a memory) a certain number of data bits to be sent to the wireless communication receiving device through a channel. The data bits may be included in a transmission block (or multiple transmission blocks) of the data, and the transmission block may be segmented to generate multiple code blocks.

In addition, the communication system 100 may be a PLMN or a Device-to-Device (D2D) network or an M2M network or a V2V network or a V2X network or another network. FIG. 1 is only a simplified schematic diagram listed as an example, and the network may further include other a network device which is not drawn in FIG. 1.

FIG. 2 illustrates a schematic flowchart of an uplink data transmission method 200 described from the view of a first MS according to an embodiment of the disclosure. As illustrated in FIG. 2, the method 200 includes the following operations.

In S210, the first MS acquires N resource allocation parameter sets from a network device. Each of the N resource allocation parameter sets includes at least one resource allocation parameter, and N is no less than 2.

In S220, the first MS sends first indication information to the network device. The first indication information indicates a service type of a first service to be transmitted by the first MS, so as for the network device to determine a first resource allocation parameter set adapted to the service type of the first service from the N resource allocation parameter sets.

In S230, the first MS receives second indication information sent by the network device. The second indication information indicates a first target resource.

In S240, the first MS determines the first resource allocation parameter set adapted to the service type of the first service from the N resource allocation parameter sets, and the first MS transmits the first service using the first target resource according to the first resource allocation parameter set.

At first, resource allocation parameter(s) used in the embodiment of the disclosure will be described in detail.

In the embodiment of the disclosure, the resource allocation parameter(s) is/are used for periodic resource scheduling (or periodic resource allocation), or, the resource allocation parameter(s) may be parameter(s) related to periodic resource scheduling. Exemplarily but unlimitedly, the resource allocation parameter(s) in each of the N resource allocation parameter sets include(s) at least one of a transmission periodicity, a receiving periodicity, a transmit power control parameter, or a number of HARQ processes.

Specifically, the transmission periodicity may be a time interval of resources used by the MS for sending data, information or the like once or for multiple times in a time domain. Exemplarily but unlimitedly, the transmission periodicity may be a size of a continuous Transmission Time Interval (TTI) used by the MS for sending the data, the information or the like.

It is to be noted that, in the embodiment of the disclosure, a data or information sending target of the MS may be a network device, or may be another MS and the like, which is not specially limited in the disclosure. When the data or information sending target of the MS is the network device, the transmission periodicity may be an uplink transmission period. In addition, when the transmission periodicity includes a period used when the MS sends the data or the information for "multiple times", a size of the period corresponding to each sending process may be the same as one another or may be different from one another, which is not specially limited in the disclosure.

The receiving periodicity may be a time interval of resources used by the MS for receiving data, information or the like once or for multiple times in the time domain. Exemplarily but unlimitedly, the receiving periodicity may be a size of a continuous TTI used by the MS for receiving the data, the information or the like.

It is to be noted that, in the embodiment of the disclosure, a source of the data or information received by the MS may be a network device or may be another MS and the like, which is not specially limited in the disclosure. When the source of the data or information received by the MS is the network device, the receiving periodicity may be a downlink transmission period. In addition, when the receiving periodicity includes a period used when the MS receives the data or the information for "multiple times", a size of the period corresponding to each receiving process may be the same as one another or may be different from one another, which is not specially limited in the disclosure.

The transmit power control parameter is a parameter related to transmit power used when the MS sends the data, the information or the like once or for multiple times. Exemplarily but unlimitedly, in the embodiment of the disclosure, the transmit power control parameter may be a maximum value of transmit power which can be used by the MS.

At present, a stop-and-wait HARQ protocol is widely used, so that it is necessary to configure the number of corresponding HARQ processes. In a process of waiting for feedback information of a certain HARQ process, another idle process may be continued to be used to transmit a data packet. A minimum Round Trip Time (RTT) of HARQ is defined as a completion time of a data packet transmission process, and includes the whole process that a data packet is started to be sent at a sender, a receiver feeds back Acknowledgement (ACK)/Negative Acknowledgement (NACK) signaling according to a result after receiving and processing and the sender determines to perform retransmission or transmit a new data packet in a next frame after demodulating and processing the ACK/NACK signaling. The number of HARQ processes is closely related to the minimum RTT of HARQ. For FDD, the number of HARQ processes is equal to the number of subframes included in a minimum RTT of HARQ; and for TDD, the number of HARQ processes is the number of subframes in the same sending direction in a minimum RTT of HARQ.

It is to be understood that the specific parameters included in the resource allocation parameters listed above are only exemplarily described and not intended to limit the disclosure, and other parameters related to periodic resource scheduling or periodic resource allocation all fall within the scope of protection of the disclosure.

It is to be noted that, in the embodiments of the disclosure, types of resource allocation parameters included in a resource allocation parameter set are not specially limited. For example, a resource allocation parameter set may include all the resource allocation parameters listed above, or a resource allocation parameter set may include part of the resource allocation parameters listed above, and types and number of resource allocation parameters included in each of the N resource allocation parameter sets in "N resource allocation parameter sets" mentioned hereinafter may be the same or may be different, which is not specially limited in the disclosure.

In S210, a MS #A (i.e., an example of the first MS) may acquire N (N is no less than 2) resource allocation parameter sets from a network device #A (i.e., an example of the network device). Here, the network device #A may be a network device, for example, a base station or an AP, accessed by the MS #A.

Exemplarily but unlimitedly, the MS #A may acquire the N resource allocation parameter sets from the network device #A through the following process.

That is, alternatively, before the operation that the first MS acquires the N resource allocation parameter sets from the network device, the method further includes that: the first MS reports T service types (i.e., an example of service information) which is supported by the first MS to the network device, so as for the network device to determine and issue the N resource allocation parameter sets to the MS according to the T service types, where T is no less than N, and each of the T service types is mapped to one resource allocation parameter set.

Specifically, in the embodiment of the disclosure, the MS #A may determine a service type of a service which is supported (or can be accessed) by the MS #A.

Exemplarily but unlimitedly, the MS #A may determine the service type which is supported by the MS #A in the following manner.

That is, alternatively, before the operation that the first MS reports the T service types which is supported by the first MS to the network device, the method further includes the following operations.

The first MS acquires information of a first mapping relationship. The information of the first mapping relationship indicates a service type of each of multiple services, where the first mapping relationship is the same as a second mapping relationship, and information of the second mapping relationship is used when the network device determines the service type of each of the multiple services.

The first MS determines the T service types corresponding to K services which is supported by the first MS according to the information of the first mapping relationship, wherein K is no less than T.

Specifically, the MS #A may acquire a service type table entry #A (i.e., an example of the information of the first mapping relationship) indicating a mapping relationship between multiple services and multiple service types.

Moreover, the network device #A may also acquire the service type table entry #A (i.e., an example of the information of the first mapping relationship).

Therefore, the MS #A and the network device #A may determine the service type of each service on the basis of the same rule, that is, for the same service #A, service types, determined by the MS #A and the network device #A, of the service #A are consistent, and furthermore, reliability of the service transmission method of the disclosure may be ensured.

Exemplarily but unlimitedly, the service type table entry #A may be issued to the MS #A and the network device #A by a high-layer management device or a telecommunication operating company, or, the service type table entry #A may be preset in the MS #A and the network device #A by manufacturers, or, the service type table entry #A may be issued to the MS #A by the network device #A (for example, in an access process of the MS #A). There are no special limits made in the disclosure.

Thereafter, the MS #A may determine a service type of each of multiple (for example, K) services which may be accessed by the MS #A according to the service type table entry #A and send indication information of multiple (for example, T) determined service types to the network device #A.

It is to be noted that, in the embodiment of the disclosure, multiple services may be of one service type and each service uniquely belongs to one service type, so that K is no less than T.

Exemplarily but unlimitedly, the MS #A may send the indication information of the T service types to the network device #A in the following manner.

That is, alternatively, the operation that the first MS reports the T service types which is supported by the first MS to the network device includes that: the first MS reports the T service types which is supported by the first MS to the network device through AS signaling.

Specifically, in the embodiment of the disclosure, the MS #A may carry the indication information of the T service types in the AS signaling for sending to the network device #A in the access process for the network device #A.

Exemplarily but unlimitedly, the AS signaling may include RRC signaling.

Or, alternatively, the operation that the first MS reports the T service types which is supported by the first MS to the network device includes that: the first MS reports the T service types which is supported by the first MS to the network device by a Mobility Management Entity (MME) through NAS signaling.

Specifically, in the embodiment of the disclosure, the MS #A may carry the indication information of the T service types in the NAS signaling for sending to the MME, so that the MME may send the indication information of the T service types to the network device #A through, for example, an 51 interface.

It is to be noted that, in the embodiment of the disclosure, a process of reporting the T service types by the MS #A may be completed by reporting for once (or, one transmission of message or signaling) or may be completed by reporting for multiple times, which is not specially limited in the disclosure.

Therefore, the network device #A may determine the T service types supported by the MS #A, and may determine the resource allocation parameter set corresponding to each of the T service types to obtain the N resource allocation parameter sets.

Exemplarily but unlimitedly, in the embodiment of the disclosure, the network device #A may acquire a resource allocation parameter set table entry #A indicating a mapping relationship between multiple service types and multiple resource allocation parameter sets, so that the network device #A may search the resource allocation parameter set table entry #A for the resource allocation parameter set corresponding to each of the T service types to further determine the N resource allocation parameter sets. It is to be noted that, in the embodiment of the disclosure, a resource allocation parameter set may correspond to multiple service types but each service type uniquely corresponds to one resource allocation parameter set, so that T is no less than N. Moreover, for example, under the condition that multiple (two or more than two) service types correspond to the same resource allocation parameter set, or, under the condition that the resource allocation parameter sets corresponding to one or more service types in the T service types are not recorded in the resource allocation parameter set table entry #A, the N resource allocation parameter sets actually correspond to M service types in the T service types, T is no less than M.

Exemplarily but unlimitedly, the resource allocation parameter set table entry #A may be issued to the network device #A by the high-layer management device or the telecommunication operating company, or, the resource allocation parameter set table entry #A may be preset in the network device #A by the manufacturer. There are no special limits made in the disclosure.

According to the service transmission method in the embodiment of the disclosure, the network device determines and issues the multiple resource allocation parameter sets to the MS according to the service types, which is supported by the MS, reported by the MS, so as to flexibly deal with different service transmission requirements of different MSs.

It is to be understood that the method and process, listed above, of determining the N resource allocation parameter sets by the network device #A are only exemplarily described and not intended to limit the disclosure. For example, the network device #A may also autonomously determine the N resource allocation parameter sets. Or, the network device #A may also determine the N resource allocation parameter sets under the condition of not referring to the service types reported by the MS #A, and exemplarily but unlimitedly, under this condition, the network device #A may take all prestored resource allocation parameter sets as the N resource allocation parameter sets.

As mentioned above, after the N resource allocation parameter sets are determined, the network device #A may issue information related to the N resource allocation parameter sets to the MS #A.

In the embodiment of the disclosure, the network device #A may send the N resource allocation parameter sets to the MS #A, for example, through the RRC signaling.

It is to be noted that, in the embodiment of the disclosure, the process of issuing the N resource allocation parameter sets by the network device #A may be completed by issuing for once (or, one transmission of message or signaling), or may be completed by issuing for n times (for example, through n configuration information, wherein one piece of configuration information is transmitted in a transmission process). There are no special limits made in the disclosure.

That is, alternatively, the operation that the first MS acquires the N resource allocation parameter sets from the network device includes that the following operations.

The first MS receives n configuration information carrying the N resource allocation parameter sets from the network device, where each piece of configuration information carries at least one of the N resource allocation parameter sets, N is no less than n, and n is no less than 1.

Moreover, the process of issuing the N resource allocation parameter sets by the network device #A may correspond to the process of reporting the T service types by the MS #A. For example, if the MS #A completes the process of reporting the T service types by one reporting, the network device #A may complete the process of issuing the N resource allocation parameter sets by issuing for once; or, if the MS #A completes the process of reporting the T service types by reporting for multiple times, the network device #A may complete the process of issuing the N resource allocation parameter sets by issuing for n times (for example, through the n configuration information), and under this condition, the resource allocation parameter set issued by the network device #A during the $i^{th}$ transmission may correspond to the service type transmitted by the MS #A during the $i^{th}$ reporting, so that, every time when the MS #A reports a service type, the MS #A may determine the resource allocation parameter set received after the $i^{th}$ reporting (or, received by the MS for the $i^{th}$ time) as the resource allocation parameter set corresponding to the service type reported for the $i^{th}$ time.

Therefore, the MS #A may acquire the N resource allocation parameter sets.

In the embodiment of the disclosure, the network device and the MS communicate the N resource allocation parameter sets before generation of a service, for example, in the access process of the MS for the network device, so that a transmission process of resource allocation parameter sets with a larger amount of information may be implemented before occurrence of the service, a service access process can be accelerated, and a user experience can be improved.

Alternatively, the N service types include a basic service type, and a resource allocation parameter set corresponding to the basic service type includes all parameters for periodic-scheduling-based service transmission.

Specifically, in the embodiment of the disclosure, the N service types may include the basic service type, and for the basic service type, its corresponding resource allocation parameter set (recorded as a basic resource allocation parameter set hereinafter for convenience of understanding and distinction) may include all parameters for periodic-scheduling-based service transmission, for example, all parameters in the transmission periodicity, the receiving periodicity, the transmit power control parameter and the number of the HARQ processes.

Moreover, in the embodiment of the disclosure, the basic resource allocation parameter set may be determined as a default parameter used during service transmission of the MS, that is, when the MS receives no resource allocation parameter set, which is indicated by the network device, for use during service transmission, the MS may perform service transmission with the basic resource allocation parameter set as a default.

In addition, alternatively, when the first resource allocation parameter set includes part of the parameters for periodic-scheduling-based service transmission, the operation that the first MS transmits the first service using the first target resource according to the first resource allocation parameter set includes the following operations.

The first MS transmits the first service with the first resource allocation parameter set, the resource allocation parameter set corresponding to the basic service type, and the first target resource.

Specifically, in the embodiment of the disclosure, the N service types may include one or more non-basic service types, and for the non-basic service types, their corresponding resource allocation parameter sets (recorded as non-basic resource allocation parameter sets hereinafter for convenience of understanding and distinction) may include all or part of the parameters for periodic-scheduling-based service transmission, for example, all or part of the parameters in the transmission periodicity, the receiving periodicity, the transmit power control parameter and the number of the HARQ processes.

When the service type of the service to be transmitted by the MS is a non-basic service type and a non-basic resource allocation parameter set corresponding to the non-basic service type includes part of the parameters for periodic-scheduling-based service transmission, assuming that all of the parameters for periodic-scheduling-based service transmission (i.e., the basic resource allocation parameter set) form a parameter set α, and the parameters in the non-basic resource allocation parameter set form a parameter set β, then the parameter set β is a subset of the parameter set α. Therefore, the network device and the MS may transmit the service of the non-basic service type on the basis of the parameters in the parameter set α other than those in the parameter set β and the parameter set β.

Exemplarily but unlimitedly, under the condition that the embodiment of the disclosure is applied to a V2V system or a V2X system, services of the basic service type may include services of transmitting information of a location, a speed, a trajectory and the like. Services of the non-basic service type may include services of transmitting information of collision alarms, emergency stop alarms and the like.

In S220, when the MS #A is required to access the service #A (i.e., an example of the first service), the MS #A may send scheduling request information #A to the network device #A, where the scheduling request information #A indicates the MS #A to request the network device #A to allocate a transmission resource (for example, a frequency-domain resource) for transmission of the service #A to the MS #A, and cells included in the scheduling request information and a sending manner may be similar to those in the prior art, and the detailed description thereof is omitted for avoiding confusion.

Moreover, the MS #A may send indication information (i.e., an example of the first indication information) of a service type (i.e., an example of the service information) of the service #A to the network device #A.

Here, the indication information of the service type of the service #A may be included in the scheduling request information #A or may be independent from the scheduling request information #A, which is not specially limited in the disclosure.

Alternatively, the operation that the first MS sends the first indication information to the network device includes that the following operations.

The first MS sends a data packet containing the first indication information to the network device through an uplink data channel, where the first indication information is carried in a MAC layer of the data packet.

Specifically, in the embodiment of the disclosure, the MS #A may carry the indication information of the service type of the service #A in a data packet for sending to the network device #A through the uplink data channel. Exemplarily but unlimitedly, the indication information of the service type of the service #A may specifically be carried in a MAC layer of the data packet.

Alternatively, the operation that the first MS sends the first indication information to the network device includes that the MS sends the first indication information to the network device through an uplink control channel.

Specifically, in the embodiment of the disclosure, the MS #A may send the indication information of the service type of the service #A to the network device #A through the uplink control channel.

Alternatively, the operation that the first MS sends the first indication information to the network device includes that the first MS sends the first indication information to the network device through RRC signaling.

Specifically, in the embodiment of the disclosure, the MS #A may send the indication information of the service type of the service #A to the network device #A through the RRC signaling.

It is to be understood that the methods, listed above, for sending the indication information of the service type of the service #A to the network device #A by the MS #A are only exemplarily described and not intended to limit the disclosure, and all other methods which may be adopted by the MS to send the information to the network device shall fall within the scope of protection of the disclosure.

Exemplarily but unlimitedly, in the embodiment of the disclosure, the system may allocate a service type identifier, for example, an SPS-Cell-RNTI (SPS-C-RNTI), capable of uniquely indicating the service type to each service type, so that the MS #A may take the service type identifier of the service type of the service #A as the first indication information.

Therefore, the network device #A may allocate the resource (i.e., the first target resource, recorded as a resource #A hereinafter for convenience of understanding and description) for transmitting the service #A to the MS #A according to the scheduling request information #A. Moreover, the network device #A may determine to use the resource allocation parameter set (i.e., an example of the first resource allocation parameter set, recorded as a resource allocation parameter set #A hereinafter for convenience of understanding and description) corresponding to the service type of the service #A according to the indication information of the service type of the service #A.

Alternatively, the first target resource is allocated to the first MS by the network device according to the service type of the first service and/or the first resource allocation parameter set.

Specifically, in the embodiment of the disclosure, the network device #A may determine the resource #A according to the resource allocation parameter set #A. Exemplarily but unlimitedly, the network device #A may ensure that a time-domain resource corresponding to the resource #A is within a transmission period indicated by the resource allocation parameter set #A according to the resource allocation parameter set #A.

Or, in the embodiment of the disclosure, the network device #A may determine the resource #A according to the service type of the service #A. Exemplarily but unlimitedly, the network device #A may ensure that the time-domain resource corresponding to the resource #A is within the transmission period indicated by the resource allocation parameter set (i.e., the resource allocation parameter set #A) corresponding to the service type of the service #A according to the service type of the first service.

It is to be understood that the manner, listed above, of allocating a resource by the network device according to resource allocation parameters used for transmission is only exemplarily described and not intended to limit the disclosure, and all other methods and processes capable of performing resource allocation according to the resource allocation parameters for transmission shall fall within the scope of protection of the disclosure.

In addition, in the embodiment of the disclosure, as the first indication information, a service identifier of the service #A may be listed. A service identifier of a service uniquely indicates the service. Therefore, the network device #A may determine, according to the service identifier of the service #A, that the MS #A needs to access the service #A and search for the resource allocation parameter set #A corresponding to the service #A according to the service type table entry #A (i.e., an example of first mapping information) acquired above.

Therefore, the network device #A may determine the resource allocation parameter set #A and resource #A for transmitting the service #A.

Moreover, the network device may send indication information (or resource scheduling information, i.e., an example of the second indication information) of the resource #A to the MS #A.

Therefore, in S230, the MS #A may acquire the indication information of the resource #A.

In S240, the MS #A may determine the resource allocation parameter set #A corresponding to the service type of the service #A and transmit the service #A with the resource allocation parameter set #A and the resource #A.

For example, the MS #A may send data of the service #A to the network device #A or other communication devices using the resource #A in a transmission periodicity indicated by the resource allocation parameter set #A.

For another example, the MS #A may receive the data of the service #A from the network device #A or the other communication devices using the resource #A in a receiving periodicity indicated by the resource allocation parameter set #A.

For another example, the MS #A may make transmit power lower than a transmit power control parameter indicated by the resource allocation parameter set #A when sending the data of the service #A.

For another example, the MS #A may retransmit the data of the service #A using a number of HARQ processes indicated by the resource allocation parameter set #A.

The method and process of determining the resource allocation parameter set #A by the MS #A in the embodiment of the disclosure will mainly be described below in detail.

In the embodiment of the disclosure, information related to the N resource allocation parameter sets acquired from the network device #A by the MS #A in S210 may be indication information only indicating the N resource allocation parameter sets (i.e., a first manner), or, the information related to the N resource allocation parameter sets acquired from the network device #A by the MS #A in S210 may be indication information indicating the N resource allocation parameter sets and the M service types (i.e., a second manner).

Methods and processes of determining the resource allocation parameter set #A by the MS #A in the first manner and the second manner will respectively be described below in detail.

The First Manner

Alternatively, the method further includes the following operations.

The first MS receives third indication information sent by the network device. The third indication information indicates the first MS to transmit the first service using the first resource allocation parameter set.

The operation that the first MS determines the first resource allocation parameter set from the N resource allocation parameter sets includes that: the first MS determines the first resource allocation parameter set from the N resource allocation parameter sets according to the third indication information.

Specifically, in the embodiment of the disclosure, the network device #A may send indication information (i.e., an example of the third indication information) of the resource allocation parameter set #A to the MS #A after determining the resource allocation parameter set #A.

Exemplarily but unlimitedly, in the embodiment of the disclosure, the following information may be adopted as the indication information of the resource allocation parameter set #A.

That is, alternatively, the operation that the first MS acquires the N resource allocation parameter sets from the network device includes that: the first MS acquires a one-to-one mapping between the N resource allocation parameter sets and N index identifiers, where the third indication information includes an index identifier corresponding to the first resource allocation parameter set.

Specifically, the network device #A may issue an index table entry #A recording the N resource allocation parameter sets and the index identifier of each of the N resource allocation parameter sets when transmitting the N resource allocation parameter sets to the MS #A.

Therefore, when being required to indicate the MS #A to transmit the service #A using the resource allocation parameter set #A determined above, the network device #A may issue the index identifier (recorded as an index identifier #A hereinafter for convenience of understanding and distinction) of the resource allocation parameter set #A to the MS #A.

Therefore, the MS #A may search the index table entry #A for the resource allocation parameter set, i.e., the resource allocation parameter set #A, indicated by the index identifier #A according to the index identifier #A.

Exemplarily but unlimitedly, in the embodiment of the disclosure, the following information may be adopted as the index identifier.

That is, alternatively, the index identifier may include a number or an RNTI.

Specifically, in the embodiment of the disclosure, the network device #A may allocate a number (i.e., an example of the index identifier) to each of the N resource allocation parameter sets, that is, the N resource allocation parameter sets and the index identifiers of the N resource allocation parameter sets are recorded in the index table entry #A. Therefore, when being required to indicate the MS #A to transmit the service #A using the resource allocation parameter set #A determined above, the network device #A may issue the number of the resource allocation parameter set #A to the MS #A, and furthermore, the MS #A may determine the resource allocation parameter set #A from the index table entry #A according to the number of the resource allocation parameter set #A.

Or, in the embodiment of the disclosure, the network device #A may allocate an RNTI (i.e., another example of the index identifier) to each of the N resource allocation parameter sets, where an RNTI uniquely corresponds to one resource allocation parameter set, that is, the N resource allocation parameter sets and the RNTI corresponding to each of the N resource allocation parameter sets are recorded in the index table entry #A. Therefore, when being required to indicate the MS #A to transmit the service #A using the resource allocation parameter set #A determined above, the network device #A may issue the RNTI corresponding to the resource allocation parameter set #A to the MS #A, and furthermore, the MS #A may determine the resource allocation parameter set #A from the index table entry #A according to the RNTI corresponding to the resource allocation parameter set #A.

The network device issues the index identifier to indicate the resource allocation parameter set used when the MS performs service transmission, so that an information amount of information required by interaction may be greatly reduced, a resource occupation rate may be reduced, an information interaction duration may be shortened, and the user experience may further be improved.

It is to be understood that the information listed above as the third indication information is only exemplarily described and not intended to limit the disclosure, and all other information capable of enabling the network device and the MS to uniquely determine the same resource allocation parameter set shall fall within the scope of protection of the disclosure.

Exemplarily but unlimitedly, in the embodiment of the disclosure, the network device #A may issue the third indication information to the MS #A in the following manner.

That is, alternatively, the first MS receives the third indication information sent by the network device through a downlink control channel.

Specifically, in the embodiment of the disclosure, the network device #A may determine the third indication information as control signaling and issue the third indication information to the MS #A through the downlink control channel.

Alternatively, the operation that the first MS receives the third indication information sent by the network device through the downlink control channel includes that: the first MS receives the third indication information through a first reserved resource in the downlink control channel.

Specifically, in the embodiment of the disclosure, a time-frequency resource for carrying the third indication information may be a reserved time-frequency resource (i.e., an example of the first reserved resource) in the downlink control channel specified in an existing communication protocol or standard, that is, the network device #A may carry the third indication information in the reserved time-frequency resource for sending, so that, when detecting that there is information contained in the reserved time-frequency resource, the MS #A may determine the information as the third indication information.

Alternatively, the operation that the first MS receives the third indication information sent by the network device includes that: the first MS determines a first preset format and takes information in the first preset format in the downlink control channel as the third indication information.

Specifically, in the embodiment of the disclosure, the network device and the MS may determine a specific format (i.e., an example of the first preset format) by protocol specification, negotiation or the like, that is, the network device #A may encapsulate the third indication information into the specific format and carry the third indication information in the downlink control channel for sending, so that, when detecting that there is information in the specific format contained in the downlink control channel, the MS #A may determine the information as the third indication information.

Alternatively, the operation that the first MS receives the third indication information sent by the network device through the downlink control channel includes that: the first MS determines a first preset RNTI and takes information containing the first preset RNTI in the downlink control channel as the third indication information.

Specifically, in the embodiment of the disclosure, the network device and the MS may determine a specific RNTI (i.e., an example of the first preset RNTI) by protocol specification, negotiation or the like, that is, the network device #A may encapsulate the specific RNTI into the third indication information and carry the third indication information in the downlink control channel for sending, so that, when detecting that there is information containing the specific RNTI in the downlink control channel, the MS #A may determine the information as the third indication information.

In addition, in the embodiment of the disclosure, the third indication information may be used as activation information, that is, the MS #A may consider that it is necessary to transmit the service through the resource allocation parameter set (i.e., the resource allocation parameter set #A) indicated by the third indication information after receiving the third indication information.

The Second Manner

Alternatively, the operation that the first MS acquires the N resource allocation parameter sets from the network device includes that: the first MS acquires a mapping between the N resource allocation parameter sets and the M service types from the network device, where M is no less than N, and each of the M service types is mapped to one resource allocation parameter set.

The operation that the first MS determines the first resource allocation parameter set from the N resource allocation parameter sets includes that: the first MS determines the first resource allocation parameter set from the N resource allocation parameter sets according to the mapping between the N resource allocation parameter sets and the M service types and the service type of the first service.

specifically, in the embodiment of the disclosure, the information related to the N resource allocation parameter sets may be a resource allocation parameter set table entry #X indicating a mapping relationship between the M service types and the N resource allocation parameter sets, and the mapping relationship, recorded in the resource allocation parameter set table entry #X, between the M service types and the N resource allocation parameter sets is consistent with the mapping relationship, stored in the network device

A and recorded in the resource allocation parameter set table entry #A, between the M service types and the N resource allocation parameter sets. Therefore, it may be ensured that the resource allocation parameter sets, determined by the MS #A and the network device #A, corresponding to the service type of the service #A are consistent with each other.

Therefore, when being required to access the service #A, the MS #A may search the resource allocation parameter set table entry #X for the resource allocation parameter set (i.e., the resource allocation parameter set #A) corresponding to the service type of the service #A according to the service type of the service #A.

It is to be understood that the method and process, listed above, of determining the resource allocation parameter set #A by the MS #A are only exemplarily described and not intended to limit the disclosure. For example, every time when the MS #A reports a service type, the MS #A may take the resource allocation parameter set received after the $i^{th}$ reporting (or received by the MS #A for the $i^{th}$ time) as the resource allocation parameter set corresponding to the service type reported for the $i^{th}$ time. Therefore, the MS #A may determine the mapping between the N resource allocation parameter sets and the M service types according to an information receiving and sending sequence, and determine the resource allocation parameter set (i.e., the resource allocation parameter set #A) corresponding to the service type of the service #A on the basis of the mapping.

Alternatively, the method further includes that: the first MS avoids transmitting the service with a resource allocation parameter set other than the first resource allocation parameter set in a period for transmitting the first service.

Specifically, in the embodiment of the disclosure, when the network device #A triggers the MS #A to start more than one resource allocation parameter set for service transmission, the MS #A may adopt only one resource allocation parameter set for service transmission in the same time period (or the same basic time allocation unit).

For example, when transmitting the service #A with the resource allocation parameter set #A, the MS #A may avoid (or forbid) transmitting the service with the resource allocation parameter set other than the resource allocation parameter set #A through an indication of the network device #A.

Or, when transmitting the service #A with the resource allocation parameter set #A, the MS #A may avoid (or forbid) transmitting the service with the resource allocation parameter set other than the resource allocation parameter set #A through a protocol specification, a factory configuration or the like.

Alternatively, the method further includes that: the first MS receives fourth indication information sent by the network device, the fourth indication information indicates the first MS to stop transmitting the service with the first resource allocation parameter set; and the first MS stops transmitting the service with the first resource allocation parameter set according to the fourth indication information.

Specifically, in the embodiment of the disclosure, the network device #A may send information (i.e., an example of the fourth indication information) indicating the MS #A to stop transmitting the service with the resource allocation parameter set #A to the MS #A when determining that it is necessary to cause the MS #A to stop transmitting the service with the resource allocation parameter set #A (for example, transmission of the service #A is completed or it is necessary to transmit a more emergent service with another resource allocation parameter set).

Exemplarily but unlimitedly, in the embodiment of the disclosure, the fourth indication information may contain the index identifier of the resource allocation parameter set #A.

Exemplarily but unlimitedly, in the embodiment of the disclosure, the network device #A may issue the fourth indication information to the MS #A in the following manner.

That is, alternatively, the operation that the first MS receives the fourth indication information sent by the network device through the downlink control channel includes that: the first MS receives the fourth indication information through a second reserved resource in the downlink control channel; or the first MS determines a second preset format and takes information in the second preset format in the downlink control channel as the fourth indication information; or the first MS determines a second preset RNTI and takes information containing the second preset RNTI in the downlink control channel as the fourth indication information.

Specifically, in the embodiment of the disclosure, the network device #A may take the fourth indication information as control signaling and issue the fourth indication information to the MS #A through the downlink control channel.

Alternatively, the operation that the first MS receives the fourth indication information sent by the network device through the downlink control channel includes that: the first MS receives the fourth indication information through the second reserved resource in the downlink control channel.

Specifically, in the embodiment of the disclosure, a time-frequency resource for carrying the fourth indication information may be a reserved time-frequency resource (i.e., an example of the second reserved resource) in the downlink control channel specified in the existing communication protocol or standard, that is, the network device #A may carry the fourth indication information in the reserved time-frequency resource for sending, so that, when detecting that there is information contained in the reserved time-frequency resource, the MS #A may take the information as the fourth indication information.

Or, in the embodiment of the disclosure, the network device and the MS may determine a specific format (i.e., an example of the second preset format) by protocol specification, negotiation or the like, that is, the network device #A may encapsulate the fourth indication information into the specific format and carry the fourth indication information in the downlink control channel for sending, so that, when detecting that there is information in the specific format contained in the downlink control channel, the MS #A may take the information as the fourth indication information.

Or, in the embodiment of the disclosure, the network device and the MS may determine a specific RNTI (i.e., an example of the second preset RNTI) by protocol specification, negotiation or the like, that is, the network device #A may encapsulate the specific RNTI into the fourth indication information and carry the fourth indication information in the downlink control channel for sending, so that, when detecting that there is information containing the specific RNTI in the downlink control channel, the MS #A may take the information as the fourth indication information.

In addition, in the embodiment of the disclosure, the fourth indication information may be used as activation information, that is, the MS #A may consider that it is necessary to avoid transmitting the service through the resource allocation parameter set (i.e., the resource allocation parameter set #A) indicated by the fourth indication information after receiving the fourth indication information.

FIG. 3 illustrates a schematic interaction diagram of an example of the service transmission method. As illustrated in FIG. 3, the following operations are included.

In S301, the MS #A may report multiple service types which are supported by the MS #A to the network device #A, for example, in an access process, for example, through RRC signaling.

In S305, the network device #A may determine multiple resource allocation parameter sets according to the multiple service types which are supported by the MS #A and issue the multiple resource allocation parameter sets to the MS #A, for example, through RRC signaling.

In S310, when the MS #A is required to transmit the service #A (or, when the service #A is generated), the MS #A may send the indication information of the service type of the service #A and the scheduling request information to the network device #A, for example, through RRC signaling or a control channel.

In S315, the network device #A may determine the resource allocation parameter set #A corresponding to the service type of the service #A, and may determine the resource #A for carrying the service #A according to the scheduling request information (or, the scheduling request information and the resource allocation parameter set #A) and issue the indication information of the resource allocation parameter set #A (for example, the index identifier of the resource allocation parameter set) and the indication information of the resource #A to the MS #A, for example, through the downlink control channel.

It is to be noted that the multiple resource allocation parameter sets may include a basic resource allocation parameter set, and when the resource allocation parameter set #A is a basic resource allocation parameter set, the network device #A may choose not to send the indication information of the resource allocation parameter set #A, that is, when the MS #A does not receive any indication information of the resource allocation parameter set within a specified time after sending the indication information of the service type, the MS #A may determine to transmit the service #A using the basic resource allocation parameter set.

In S320, the MS #A may transmit the service #A (for example, with the network device #A) using the resource #A with the resource allocation parameter set #A.

In S325, for example, after transmission of the service #A is completed, the network device #A may indicate the MS #A to stop transmitting the service with the resource allocation parameter set #A.

It is to be understood that the service type, listed above, of the service #A is only an example of the information (i.e., service information of the service #A) determining the resource allocation parameter set #A and not intended to specially limit the disclosure, and all other information capable of forming a mapping relationship with the resource allocation parameter set and determining the resource allocation parameter set shall fall within the scope of protection of the disclosure. Exemplarily but unlimitedly, the service information may further include various information, for example, a delay requirement of the service, a transmission rate requirement of the service, an emergency degree of the service, a quality of service requirement of the service, a priority of a data packet of the service and an index of a logical channel of the service, besides the service type. Descriptions about the same or similar conditions will be eliminated below.

According to the service transmission method in the embodiment of the disclosure, the first MS negotiates with the network device to determine multiple resource allocation parameter sets in advance, the multiple resource allocation parameter sets correspond to multiple SPS manners respectively, and when the first MS and the network device are required to transmit the first service, the first MS and the network device may determine the first resource allocation parameter set corresponding to the service type of the first service from the multiple (N) resource allocation parameter sets according to the service type of the first service and transmit the first service according to the first resource allocation parameter set, so as to flexibly and rapidly deal with different requirements of different services on SPS.

FIG. 4 illustrates a schematic flowchart of an uplink data transmission method 400 described from the view of a first MS according to another embodiment of the disclosure. As illustrated in FIG. 4, the method 400 includes the following operations.

In S410, the first MS acquires N resource allocation parameter sets. Each of the N resource allocation parameter sets includes at least one resource allocation parameter, and N is no less than 2.

In S420, the first MS determines a second resource allocation parameter set adapted to a service type of a second service from the N resource allocation parameter sets according to the service type of the second service, and the first MS determines a second target resource.

In S430, the first MS sends indication information of the second resource allocation parameter set and indication information of the second target resource to a second MS.

In S440, the first MS transmits the second service with the second MS using the second target resource according to the second resource allocation parameter set.

At first, a resource allocation parameter used in the embodiment of the disclosure will be described in detail.

In the embodiment of the disclosure, the resource allocation parameter(s) is/are used for periodic resource scheduling (or periodic resource allocation), or, the resource allocation parameter(s) may be parameter(s) related to periodic resource scheduling. Exemplarily but unlimitedly, the resource allocation parameter(s) in each of the N resource allocation parameter sets include(s) at least one of a transmission periodicity, a receiving periodicity, a transmit power control parameter, or a number of HARQ processes.

Specifically, the transmission periodicity may be a size of a time-domain resource used by the MS for sending data, information or the like once or for multiple times. Exemplarily but unlimitedly, the transmission periodicity may be a number of continuous TTIs used by the MS for sending the data, the information or the like.

It is to be noted that, in the embodiment of the disclosure, a data or information sending target of the MS may be a network device or may be another MS and the like, which is not specially limited in the disclosure. When the data or information sending target of the MS is the network device, the transmission periodicity may be an uplink transmission period. In addition, when the transmission periodicity includes a period used when the MS sends the data or the information for "multiple times", a size of the period corresponding to each sending process may be the same or may be different, which is not specially limited in the disclosure.

The receiving periodicity may be a size of a time-domain resource used by the MS for receiving data, information or the like once or for multiple times. Exemplarily but unlimitedly, the receiving periodicity may be a number of continuous TTIs used by the MS for receiving the data, the information or the like.

It is to be noted that, in the embodiment of the disclosure, a source of the data or information received by the MS may be a network device or may be another MS and the like, which is not specially limited in the disclosure. When the source of the data or information received by the MS is the network device, the receiving periodicity may be a downlink transmission period. In addition, when the receiving periodicity includes a period used when the MS receives the data or the information for "multiple times", a size of the period corresponding to each receiving process may be the same as one another or may be different from one another, which is not specially limited in the disclosure.

The transmit power control parameter is a parameter related to transmit power used when the MS sends the data, the information or the like once or for multiple times. Exemplarily but unlimitedly, in the embodiment of the disclosure, the transmit power control parameter may be a maximum value of transmit power which can be used by the MS.

At present, a stop-and-wait HARQ protocol is widely used, so that it is necessary to configure the number of corresponding HARQ processes. In a process of waiting for feedback information of a certain HARQ process, another idle process may be continued to be to transmit a data packet. A minimum RTT of HARQ is defined as a completion time of a data packet transmission process, and includes the whole process that a data packet is started to be sent at a sender, a receiver feeds back ACK/NACK signaling according to a result after receiving and processing and the sender determines to perform retransmission or transmit a new data packet in a next frame after demodulating and processing the ACK/NACK signaling. The number of the HARQ processes is closely related to the minimum RTT of HARQ. For FDD, the number of HARQ processes is equal to the number of subframes included in a minimum RTT of HARQ; and for TDD, the number of HARQ processes is the number of subframes in the same sending direction in a minimum RTT of HARQ.

It is to be understood that the specific parameters included in the resource allocation parameters listed above are only exemplarily described and not intended to limit the disclosure, and other parameters related to periodic resource scheduling or periodic resource allocation all fall within the scope of protection of the disclosure.

It is to be noted that, in the embodiment of the disclosure, types of resource allocation parameters included in a resource allocation parameter set are not specially limited. For example, a resource allocation parameter set may include all the resource allocation parameters listed above, or a resource allocation parameter set may include part of the resource allocation parameters listed above, and types and numbers of resource allocation parameters included in each of the N resource allocation parameter sets in "N resource allocation parameter sets" mentioned hereinafter may be the same or may be different, which is not specially limited in the disclosure.

In S410, a MS #B (i.e., an example of the first MS) may acquire N (N is no less than 2) resource allocation parameter sets.

Alternatively, the operation that the first MS acquires the N resource allocation parameter sets includes that: the first MS acquires a mapping between the N resource allocation parameter sets and M service types, where each of the M service types is mapped to one resource allocation parameter set, and M is no less than N.

Specifically, in the embodiment of the disclosure, the MS #B may acquire a resource allocation parameter set table entry #Y of a mapping relationship between the N resource allocation parameter sets and the M service types.

It is to be understood that the manner, listed above, of acquiring the N resource allocation parameter sets by the first MS is only exemplarily described and not intended to limit the disclosure. For example, the first MS may merely acquire the N resource allocation parameter sets. For convenience of understanding and description, a process of acquiring the N resource allocation parameter sets will be described below with a process of acquiring the resource allocation parameter set table entry #Y without specification.

In the embodiment of the disclosure, the resource allocation parameter set table entry #Y (i.e., an example of the N resource allocation parameter sets) may be preset in the MS #B as a factory configuration.

That is, alternatively, the mapping between the N resource allocation parameter sets and the M service types is preset in the first MS.

Or, in the embodiment of the disclosure, the MS #B may acquire the resource allocation parameter set table entry #Y from a network device serving it (record as a network device #B hereinafter for convenience of understanding and distinction) when joining a network.

That is, alternatively, the operation that the first MS acquires the mapping between the N resource allocation parameter sets and the M service types includes that: the first MS acquires the mapping between the N resource allocation parameter sets and the M service types from a network device.

Exemplarily but unlimitedly, the MS #B may acquire the resource allocation parameter set table entry #Y from the network device #B through the following process.

That is, alternatively, before the operation that the first MS acquires the N resource allocation parameter sets, the method further includes that: the first MS reports T service types which is supported by the first MS to the network device, so as for the network device to determine and issue the N resource allocation parameter sets to the MS according to the T service types, where T is no less than N, and each of the T service types is mapped to one resource allocation parameter set.

Specifically, in the embodiment of the disclosure, the MS #B may determine a service type of a service which is supported (or accessed) by the MS #B.

Exemplarily but unlimitedly, the MS #B may determine the service type which is supported by the MS #B in the following manner.

That is, alternatively, before the operation that the first MS reports the T service types which is supported by the first MS to the network device, the method further includes that: the first MS acquires information of a first mapping relationship indicating a service type of each of multiple services, the first mapping relationship is the same as a second mapping relationship, and information of the second mapping relationship is used when the network device determines the service type of each of the multiple services; and the first MS determines the T service types corresponding to K services which is supported by the first MS according to the information of the first mapping relationship, where K is no less than T.

Specifically, the MS #B may acquire a service type table entry #B (i.e., an example of the information of the first mapping relationship) indicating a mapping relationship between multiple services and multiple service types.

Moreover, the network device #B may also acquire the service type table entry #B (i.e., an example of the information of the first mapping relationship).

Therefore, the MS #B and the network device #B may determine the service type of each service on the basis of the same rule, that is, for the same service #B, service types, determined by the MS #B and the network device #B, of the service #B are consistent with each other, and thus, reliability of the service transmission method of the disclosure may be ensured.

Exemplarily but unlimitedly, the service type table entry #B may be issued to the MS #B and the network device #B by a high-layer management device or a telecommunication operating company, or, the service type table entry #B may also be preset in the MS #B and the network device #B by manufacturers, or, the service type table entry #B may be issued to the MS #B by the network device #B (for example, in an access process of the MS #B). There are no special limits made in the disclosure.

Thereafter, the MS #B may determine a service type of each of multiple (for example, K) services which may be accessed by the MS #B according to the service type table entry #B and send indication information of multiple (for example, T) determined service types to the network device #B.

It is to be noted that, in the embodiment of the disclosure, multiple services may be of one service type and each service uniquely belongs to one service type, so that K is no less than T.

Exemplarily but unlimitedly, the MS #B may send the indication information of the T service types to the network device #B in the following manner.

That is, alternatively, the operation that the first MS reports the T service types which is supported by the first MS to the network device includes that: the first MS reports the T service types which is supported by the first MS to the network device through AS signaling.

Specifically, in the embodiment of the disclosure, the MS #B may carry the indication information of the T service types in the AS signaling for sending to the network device #B in the access process for the network device #B.

Exemplarily but unlimitedly, the AS signaling may include RRC signaling.

Or, alternatively, the operation that the first MS reports the T service types which is supported by the first MS to the network device includes that: the first MS reports the T service types which is supported by the first MS to the network device by an MME through NAS signaling.

Specifically, in the embodiment of the disclosure, the MS #B may carry the indication information of the T service types in the NAS signaling for sending to the MME, so that the MME may send the indication information of the T service types to the network device #B through, for example, an 51 interface.

It is to be noted that, in the embodiment of the disclosure, a process of reporting the T service types by the MS #B may be completed by reporting for once (or, one transmission of message or signaling) or may be completed by reporting for multiple times, which is not specially limited in the disclosure.

Therefore, the network device #B may determine the T service types supported by the MS #B, and may determine the resource allocation parameter set corresponding to each of the T service types to obtain the N resource allocation parameter sets.

Exemplarily but unlimitedly, in the embodiment of the disclosure, the network device #B may acquire a resource allocation parameter set table entry #B indicating a mapping relationship between multiple service types and multiple resource allocation parameter sets, so that the network device #B may search the resource allocation parameter set table entry #B for the resource allocation parameter set corresponding to each of the T service types to further determine the N resource allocation parameter sets. It is to be noted that, in the embodiment of the disclosure, a resource allocation parameter set may correspond to multiple service types but each service type uniquely corresponds to one resource allocation parameter set, so that T is no less than N. Moreover, for example, under the condition that multiple (two or more than two) service types correspond to the same resource allocation parameter set, or, under the condition that the resource allocation parameter sets corresponding to one or more service types in the T service types are not recorded in the resource allocation parameter set table entry #B, the N resource allocation parameter sets actually correspond to M service types in the T service types, T is no less than M.

Exemplarily but unlimitedly, the resource allocation parameter set table entry #B may be issued to the network device #B by the high-layer management device or the telecommunication operating company, or, the resource allocation parameter set table entry #B may also be preset in the network device #B by the manufacturer. There are no special limits made in the disclosure.

According to the service transmission method in the embodiment of the disclosure, the network device determines and issues the multiple resource allocation parameter sets to the MS according to the service types, which is supported by the MS, reported by the MS, so as to flexibly deal with different service transmission requirements of different MSs.

It is to be understood that the method and process, listed above, of determining the mapping between the N resource allocation parameter sets and the M service types by the network device #B are only exemplarily described and not intended to limit the disclosure. For example, the network device #B may also autonomously determine the mapping between the N resource allocation parameter sets and the M service types. Or, the network device #B may also determine the mapping between the N resource allocation parameter sets and the M service types under the condition of not referring to the service types reported by the MS #B, and exemplarily but unlimitedly, under this condition, the network device #B may take all prestored resource allocation parameter sets as the N resource allocation parameter sets.

As mentioned above, after the N resource allocation parameter sets are determined, the network device #B may transmit the mapping (i.e., the resource allocation parameter set table entry #Y) between the N resource allocation parameter sets and the M service types to the MS #B.

In the embodiment of the disclosure, the network device #B may send the resource allocation parameter set table entry #Y to the MS #B, for example, through the RRC signaling.

It is to be noted that, in the embodiment of the disclosure, the process of transmitting the resource allocation parameter set table entry #Y by the network device #B may be completed by once transmission (or, once message or signaling transmission), or may be completed by issuing for n times (for example, through n configuration information, where one piece of configuration information is transmitted in a transmission process). There are no special limits made in the disclosure.

Moreover, the process of issuing the N resource allocation parameter sets by the network device #B may correspond to the process of reporting the T service types by the MS #B. For example, if the MS #B completes the process of reporting the T service types by one reporting, the network device #B may complete the process of issuing the N resource allocation parameter sets by issuing for once; or, if the MS #B completes the process of reporting the T service types by reporting for multiple times, the network device #B may complete the process of issuing the N resource allocation parameter sets by issuing for n times (for example, through the n configuration information), and under this condition, the resource allocation parameter set issued by the network device #B during $i^{th}$ transmission may correspond to the service type transmitted by the MS #B during $i^{th}$ reporting, so that, every time when the MS #B reports a service type, the MS #B may determine the resource allocation parameter set received after the $i^{th}$ reporting (or, received by the MS #B for the $i^{th}$ time) as the resource allocation parameter set corresponding to the service type reported for the $i^{th}$ time.

Therefore, the MS #B may acquire the resource allocation parameter set table entry #Y.

In the embodiment of the disclosure, the network device and the MS transmit the N resource allocation parameter sets before generation of a service, for example, in the access process of the MS for the network device, so that a transmission process of resource allocation parameter sets with a larger amount of information may be implemented before occurrence of the service, a service access process can be accelerated, and a user experience can be improved.

Alternatively, the N service types include a basic service type, and a resource allocation parameter set corresponding to the basic service type includes all parameters for periodic-scheduling-based service transmission.

Specifically, in the embodiment of the disclosure, the N service types may include the basic service type, and for the basic service type, its corresponding resource allocation parameter set (recorded as a basic resource allocation parameter set hereinafter for convenience of understanding and distinction) may include all of the parameters for periodic-scheduling-based service transmission, for example, all of the parameters in the transmission periodicity, the receiving periodicity, the transmit power control parameter and the number of the HARQ processes.

Moreover, in the embodiment of the disclosure, the basic resource allocation parameter set may be determined as a default parameter used during service transmission of the MS, that is, when the MS receives no resource allocation parameter set, which is indicated by the network device, for use during service transmission, the MS may perform service transmission with the basic resource allocation parameter set as a default.

In addition, alternatively, the N service types include the basic service type, the resource allocation parameter set corresponding to the basic service type includes all parameters for SPS-based data transmission, the resource allocation parameter set corresponding to the basic service type is stored in the second MS.

When the second resource allocation parameter set includes part of the parameters for periodic-scheduling-based service transmission, the operation that the first MS transmits the second service with the second MS using the second target resource according to the second resource allocation parameter set includes that: the first MS transmits the second service with the second MS with the second resource allocation parameter set, the resource allocation parameter set corresponding to the basic service type and the second target resource.

Specifically, in the embodiment of the disclosure, the N service types may include one or more non-basic service types, and for the non-basic service types, their corresponding resource allocation parameter sets (recorded as non-basic resource allocation parameter sets hereinafter for convenience of understanding and distinction) may include all or part of the parameters for periodic-scheduling-based service transmission, for example, all or part of the parameters in the transmission periodicity, the receiving periodicity, the transmit power control parameter and the number of the HARQ processes.

When the service type of the service to be transmitted by the MS is a non-basic service type and a non-basic resource allocation parameter set corresponding to the non-basic service type includes part of the parameters for periodic-scheduling-based service transmission, assuming that all of the parameters for periodic-scheduling-based service transmission (i.e., the basic resource allocation parameter set) form a parameter set α, and the parameters in the non-basic resource allocation parameter set form a parameter set β, and the parameter set β is a subset of the parameter set α. Therefore, the network device and the MS may transmit the service of the non-basic service type with the parameters in the parameter set α other than those in the parameter set β and the parameter set β.

Exemplarily but unlimitedly, under the condition that the embodiment of the disclosure is applied to a V2V system or a V2X system, services of the basic service type may include services of transmitting information of a location, a speed, a trajectory and the like. Services of the non-basic service type may include services of transmitting information of collision alarms, emergency stop alarms and the like.

It is to be noted that a MS #C mentioned below may acquire a basic resource allocation parameter set in a manner as same as or similar to that adopted by the MS #B.

In S420, when the MS #B is required to transmit the service #B (i.e., an example of the second service) with another MS (recorded as the MS #C hereinafter for convenience of understanding and distinction), the MS #B may acquire a resource (i.e., the second target resource, recorded as a resource #B hereinafter for convenience of understanding and description) for transmitting the service #B (for example, on the basis of an indication of the network device or in a contention manner).

Moreover, the MS #B may determine a resource allocation parameter set (i.e., an example of the second resource allocation parameter set, recorded as a resource allocation parameter set #B hereinafter for convenience of understanding and description) corresponding to the service type of the service #B.

For example, the MS #B may search the resource allocation parameter set table entry #Y for the resource allocation parameter set corresponding to the service #B and take the same as the resource allocation parameter set #B.

Or, for another example, the MS #B may acquire the specified relationship, acquired above, between the N resource allocation parameter sets and the M service types in a manner of a factory setting, a communication protocol specification or the like and take the resource allocation parameter set corresponding to the service #B as the resource allocation parameter set #B on the basis of the mapping.

Alternatively, the operation that the first MS determines the second target resource includes that the first MS determines the second target resource according to the service type of the second service and/or the second resource allocation parameter set.

Specifically, in the embodiment of the disclosure, the MS #B may determine the resource #B according to the resource allocation parameter set #B. Exemplarily but unlimitedly, the MS #B may ensure that a time-domain resource corresponding to the resource #B is within a transmission period indicated by the resource allocation parameter set #B according to the resource allocation parameter set #B.

It is to be understood that the manner, listed above, of allocating a resource by the network device according to resource allocation parameters for transmission is only exemplarily described and not intended to limit the disclosure, and all other methods and processes capable of performing resource allocation according to the resource allocation parameters used for transmission shall fall within the scope of protection of the disclosure. For example, the MS #B may further ensure that the time-domain resource corresponding to the resource #B is within the transmission period indicated by the resource allocation parameter set (i.e., the resource allocation parameter set #B) corresponding to the service type of the service #B according to the service type of the service #B.

Therefore, the MS #B may determine the resource allocation parameter set #B and resource #B for transmitting the service #B.

Moreover, in S430, the MS #B may send indication information of the resource allocation parameter set #B (i.e., an example of indication information of the second resource allocation parameter set) and indication information of the resource #B (i.e., indication information of the second target resource) to the MS #C, for example, through a control channel.

Therefore, the MS #C may determine the resource #B and the resource allocation parameter set #B.

In S440, the MS #B may transmit the service #B with the MS #C with the resource allocation parameter set #B and the resource #B.

For example, the MS #B may send data of the service #B to the MS #C using the resource #B in a transmission periodicity indicated by the resource allocation parameter set #B.

For another example, the MS #B may receive the data of the service #B from the MS #C using the resource #B in a receiving periodicity indicated by the resource allocation parameter set #B.

For another example, the MS #B may make transmit power lower than a transmit power control parameter indicated by the resource allocation parameter set #B when sending the data of the service #A, and, the MS #C may make transmit power lower than the transmit power control parameter indicated by the resource allocation parameter set #B when sending data of a service #C.

For another example, the MS #B may retransmit the data of the service #B using a number of HARQ processes indicated by the resource allocation parameter set #B, and the MS #C may retransmit the data of the service #C using the number of the HARQ processes indicated by the resource allocation parameter set #B.

Alternatively, the method further includes that the second MS avoids transmitting the service with a resource allocation parameter set other than the second resource allocation parameter set in a period for transmitting the second service.

Specifically, in the embodiment of the disclosure, when the MS #B starts more than one resource allocation parameter set for service transmission, the MS #B may adopt only one resource allocation parameter set for service transmission in the same time bucket (or the same basic time allocation unit).

For example, the MS #B may avoid (or forbid) transmitting the service with the resource allocation parameter set other than the resource allocation parameter set #B when transmitting the service #B with the resource allocation parameter set #B through an indication of the network device.

Or, the MS #B may avoid (or forbid) transmitting the service with the resource allocation parameter set other than the resource allocation parameter set #B when transmitting the service #B with the resource allocation parameter set #B through a protocol specification, a factory configuration or the like.

Alternatively, the method further includes that the first MS receives fifth indication information sent by the second MS, the fifth indication information indicates the second MS to stop transmitting the service with the second resource allocation parameter set.

Specifically, in the embodiment of the disclosure, the MS #B may send information (i.e., an example of the fifth indication information) indicating the MS #C to stop transmitting the service with the resource allocation parameter set #B to the MS #C when determining that it is necessary to cause the MS #C to stop transmitting the service with the resource allocation parameter set #B (for example, transmission of the service #B is completed or it is necessary to transmit a more emergent service with another resource allocation parameter set).

Exemplarily but unlimitedly, in the embodiment of the disclosure, the fifth indication information may contain an index identifier of the resource allocation parameter set #B.

In the embodiment of the disclosure, the fifth indication information may be used as activation information, that is, the MS #C may consider that it is necessary to avoid transmitting the service through the resource allocation parameter set (i.e., the resource allocation parameter set #B) indicated by the fifth indication information after receiving the fifth indication information.

FIG. 5 illustrates a schematic interaction diagram of an example of the service transmission method. As illustrated in FIG. 5, the following operations are included.

Alternatively, in S501, the MS #B may report multiple service types which are supported by the MS #B to the network device #B, for example, in an access process, for example, through RRC signaling.

In S505, the network device #B may determine multiple resource allocation parameter sets according to the multiple service types which are supported by the MS #B and issue the multiple resource allocation parameter sets to the MS #B, for example, through RRC signaling.

In S510, when the MS #B is required to transmit the service #B with the MS #C (or, when the service #B is generated), the MS #B may determine the resource allocation parameter set #B corresponding to the service type of the service #B. Moreover, the MS #B may determine the resource #B for carrying the service #B and send the indication information of the resource allocation parameter set #B (for example, the index identifier of the resource allocation parameter set #B) and the indication information of the resource #B to the MS #C, for example, through a control channel.

It is to be noted that the multiple resource allocation parameter sets may include a basic resource allocation parameter set. When the resource allocation parameter set #B is a basic resource allocation parameter set, the MS #B may choose not to send the indication information of the resource allocation parameter set #B, that is, when the MS #C does not receive any indication information of the resource allocation parameter set within a specified time after receiving the indication information of the resource #B, the MS #C may determine to transmit the service #B using the basic resource allocation parameter set.

In S515, the MS #B and the MS #C may transmit the service #B using the resource #B with the resource allocation parameter set #B.

In S520, for example, after transmission of the service #B is completed, the MS #B may indicate the MS #C to stop transmitting the service with the resource allocation parameter set #B.

According to the service transmission method in the embodiment of the disclosure, the first MS determines multiple resource allocation parameter sets by negotiation in advance, the multiple resource allocation parameter sets correspond to multiple SPS manners respectively, and when the first MS and the second MS are required to transmit the second service, the first MS may determine the second resource allocation parameter set corresponding to the service type of the second service from the multiple (N) resource allocation parameter sets according to the service type of the second service and transmit the second service with the second MS according to the second resource allocation parameter set, so as to flexibly and rapidly deal with different requirements of different services on SPS.

FIG. 6 illustrates a schematic flowchart of a service transmission method 600 described from the view of a network device according to an embodiment of the disclosure. As illustrated in FIG. 6, the method 600 includes the following operations.

In S610, the network device issues N resource allocation parameter sets to a first MS. Each of the N resource allocation parameter sets includes at least one resource allocation parameter, and N is no less than 2.

In S620, the network device receives first indication information sent by the first MS. The first indication information indicates a service type of a first service to be transmitted by the first MS.

In S630, the network device determines a first resource allocation parameter set corresponding to the service type of the first service from the N resource allocation parameter sets according to the first indication information.

In S640, the network device determines a first target resource and sends second indication information indicating the first target resource to the first MS.

Alternatively, the operation that the network device determines the first target resource includes that the network device determines the first target resource according to the first resource allocation parameter set.

Alternatively, the operation that the network device issues the N resource allocation parameter sets to the first MS includes that the network device issues a mapping between the N resource allocation parameter sets and M service types to the first MS, where M is no less than N, and each of the M service types is mapped to one resource allocation parameter set.

Alternatively, the method further includes that the network device sends third indication information to the first MS. The third indication information indicates the first MS to transmit the first service using the first resource allocation parameter set.

Alternatively, the operation that the network device sends the third indication information to the first MS includes that: the network device sends the third indication information to the first MS through a downlink control channel.

Alternatively, the operation that the network device sends the third indication information to the first MS through the downlink control channel includes that the network device sends the third indication information to the first MS through a first reserved resource in the downlink control channel; or the network device determines a first preset format and generates and sends the third indication information according to the first preset format; or the network device determines a first preset RNTI and contains the first preset RNTI in the third indication information for sending to the first MS.

Alternatively, the operation that the network device issues the N resource allocation parameter sets to the first MS includes that the network device issues a one-to-one mapping between the N resource allocation parameter sets and N index identifiers to the first MS, the third indication information including an index identifier corresponding to the first resource allocation parameter set.

Alternatively, the index identifier includes a number or an RNTI.

Alternatively, before the operation that the network device issues the N resource allocation parameter sets to the first MS, the method further includes that the network device acquires T service types which are supported by the first MS from the first MS; and the network device determines the N resource allocation parameter sets according to the T service types, where T is no less than N, and each of the T service types is mapped to one resource allocation parameter set.

Alternatively, the operation that the network device acquires the T service types which are supported by the first MS from the first MS includes that the network device acquires the T service types, which are supported by the first MS, reported by the first MS through AS signaling; or the network device acquires the T service types which are supported by the first MS through an MME, the T service types which are supported by the first MS are reported to the MME by the first MS through NAS signaling.

Alternatively, the operation that the network device receives the first indication information sent by the first MS includes that the network device receives the first indication information sent by the first MS through an uplink data channel, where the first indication information is carried in a MAC layer of a data packet; or the network device receives the first indication information sent by the first MS through an uplink control channel; or the network device receives the first indication information sent by the first MS through RRC signaling.

Alternatively, the method further includes that the network device sends fifth indication information to the first MS. The fifth indication information indicates the first MS to stop transmitting the service with the first resource allocation parameter set.

Alternatively, the resource allocation parameter in each of the N resource allocation parameter sets includes at least one of the following parameters: a transmission periodicity, a receiving periodicity, an uplink power control parameter, or a number of HARQ processes.

Alternatively, the operation that the network device issues the N resource allocation parameter sets to the first MS includes that the network device sends n configuration information carrying the N resource allocation parameter sets to the first MS. Each piece of configuration information carries at least one of the N resource allocation parameter sets, N is no less than n, and n is no less than 1.

Alternatively, the method further includes that the network device acquires information of a second mapping relationship. The information of the second mapping relationship indicates a service type of each of multiple services, and the second mapping relationship is the same as a first mapping relationship, and information of the first mapping relationship is used when the first MS determines the service type of each of the multiple services.

The actions of the first MS in the method 600 are similar to the actions of the MS #A in the method 200, and the actions of the network device in the method 600 are similar to the actions of the network device #A in the method 200. Here, detailed descriptions will be omitted for avoiding repetition.

According to the service transmission method in the embodiment of the disclosure, the first MS negotiates with the network device to determine multiple resource allocation parameter sets in advance, the multiple resource allocation parameter sets correspond to multiple SPS manners respectively, and when the first MS and the network device are required to transmit the first service, the first MS and the network device may determine the first resource allocation parameter set corresponding to the service type of the first service from the multiple (N) resource allocation parameter sets according to the service type of the first service and transmit the first service according to the first resource allocation parameter set, so as to flexibly and rapidly deal with different requirements of different services on SPS.

FIG. 7 illustrates a schematic flowchart of a service transmission method 700 described from the view of a MS according to an embodiment of the disclosure. As illustrated in FIG. 7, the method 700 includes the following operations.

In S710, a second MS receives indication information of a second resource allocation parameter set and indication information of a second target resource from a first MS. The second resource allocation parameter set corresponds to a service type of a second service and the second resource allocation parameter set is determined from N resource allocation parameter sets by the first MS according to a mapping between the N resource allocation parameter sets and M service types and a service type of the second service.

In S720, the second MS transmits the second service with the first MS using the second target resource according to the second resource allocation parameter set.

Alternatively, the second target resource is determined by the first MS according to the second resource allocation parameter set.

Alternatively, resource allocation parameter(s) in each of the N resource allocation parameter sets include(s) at least one of the following parameters: a transmission periodicity, a receiving periodicity, an uplink power control parameter, or a number of HARQ processes.

Alternatively, the method further includes that the second MS avoids transmitting the service with a resource allocation parameter set other than the second resource allocation parameter set in a period for transmitting the second service.

Alternatively, N service types include a basic service type, a resource allocation parameter set corresponding to the basic service type includes all parameters for SPS-based data transmission, the resource allocation parameter set corresponding to the basic service type is stored in the second MS.

When the second resource allocation parameter set includes part of the parameters for periodic-scheduling-based service transmission, the operation that the second MS transmits the second service with the first MS using the second target resource according to the second resource allocation parameter set includes that the second MS transmits the second service with the first MS with the second resource allocation parameter set, the resource allocation parameter set corresponding to the basic service type, and the second target resource.

The actions of the first MS in the method 700 are similar to the actions of the MS #B in the method 400, and the actions of the second MS in the method 700 are similar to the actions of the MS #C in the method 400. Here, detailed descriptions will be omitted for avoiding repetition.

According to the service transmission method in the embodiment of the disclosure, the first MS determines multiple resource allocation parameter sets by negotiation in advance, the multiple resource allocation parameter sets correspond to multiple SPS manners respectively, and when the first MS and the second MS are required to transmit the second service, the first MS may determine the second resource allocation parameter set corresponding to the service type of the second service from the multiple (N) resource allocation parameter sets according to the service type of the second service and transmit the second service with the second MS according to the second resource allocation parameter set, so as to flexibly and rapidly deal with different requirements of different services on SPS.

Figure 8:
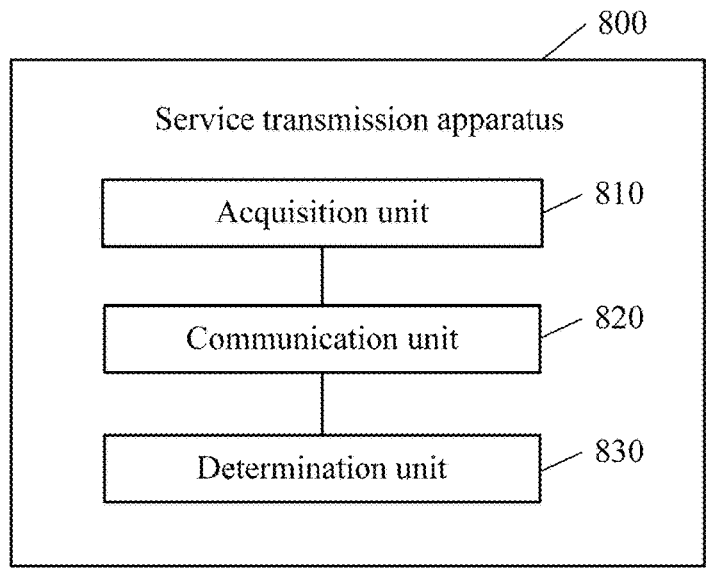
FIG. 8 illustrates a schematic block diagram of an example of a service transmission apparatus according to an embodiment of the disclosure.

FIG. 8 illustrates a schematic block diagram of a service transmission apparatus 800 according to an embodiment of the disclosure. As illustrated in FIG. 8, the apparatus 800 includes an acquisition unit 810, a communication unit 820, and a determination unit 830.

The acquisition unit 810 is configured to acquire N resource allocation parameter sets from a network device. Here, each of the N resource allocation parameter sets includes at least one resource allocation parameter, and N is no less than 2.

The communication unit 820 is configured to send first indication information to the network device. Here, the first indication information indicates a service type of a first service to be transmitted by the apparatus for the network device to determine a first resource allocation parameter set corresponding to the service type of the first service from the N resource allocation parameter sets. The communication unit 820 is further configured to receive second indication information sent by the network device Here, the second indication information indicates a first target resource.

The determination unit 830 is configured to determine the first resource allocation parameter set corresponding to the service type of the first service from the N resource allocation parameter sets.

The communication unit 820 is further configured to transmit the first service using the first target resource according to the first resource allocation parameter set.

Alternatively, the first target resource is allocated to the apparatus by the network device according to the first resource allocation parameter set.

Alternatively, the acquisition unit is specifically configured to acquire a mapping between the N resource allocation parameter sets and M service types from the network device, where M is no less than N, and each of the M service types is mapped to one resource allocation parameter set; and the determination unit is specifically configured to determine the first resource allocation parameter set from the N resource allocation parameter sets according to the mapping between the N resource allocation parameter sets and the M service types and the service type of the first service.

Alternatively, the communication unit is further configured to receive third indication information sent by the network device. Here, the third indication information indicates the apparatus to transmit the first service using the first resource allocation parameter set; and the determination unit determines the first resource allocation parameter set from the N resource allocation parameter sets according to the third indication information.

Alternatively, the communication unit is specifically configured to receive the third indication information sent by the network device through a downlink control channel.

Alternatively, the communication unit is specifically configured to receive the third indication information through a first reserved resource in the downlink control channel; or the communication unit is specifically configured to determine a first preset format and take information in the first preset format in the downlink control channel as the third indication information; or the communication unit is specifically configured to determine a first preset RNTI and take information containing the first preset RNTI in the downlink control channel as the third indication information.

Alternatively, the acquisition unit is specifically configured to acquire a one-to-one mapping between the N resource allocation parameter sets and N index identifiers from the network device, the third indication information including the index identifier corresponding to the first resource allocation parameter set.

Alternatively, the index identifier includes a number or an RNTI.

Alternatively, the communication unit is further configured to report T service types which are supported by the apparatus to the network device, so as for the network device to determine and issue the N resource allocation parameter sets to the MS according to the T service types, where T is no less than N, and each of the T service types is mapped to one resource allocation parameter set.

Alternatively, the acquisition unit is further configured to acquire information of a first mapping relationship. Here, the information of the first mapping relationship indicates a service type of each of multiple services, the first mapping relationship is the same as a second mapping relationship, and information of the second mapping relationship is used when the network device determines the service type of each of the multiple services; and the determination unit is further configured to determine the T service types corresponding to K services which are supported by the apparatus according to the information of the first mapping relationship, where K is no less than T.

Alternatively, the communication unit is specifically configured to report the T service types which are supported by the apparatus to the network device through AS signaling; or the communication unit is specifically configured to report the T service types which are supported by the apparatus to the network device by an MME through NAS signaling.

Alternatively, the communication unit is specifically configured to send a data packet containing the first indication information to the network device through an uplink data channel, where the first indication information is carried in a MAC layer of the data packet; or the communication unit is specifically configured to send the first indication information to the network device through an uplink control channel; or the communication unit is specifically configured to send the first indication information to the network device through RRC signaling.

Alternatively, the communication unit is further configured to receive fourth indication information sent by the network device. Here, the fourth indication information indicates the apparatus to stop transmitting the service with the first resource allocation parameter set. The communication unit is further is configured to stop transmitting the service with the first resource allocation parameter set according to the fourth indication information.

Alternatively, the communication unit is specifically configured to receive the fourth indication information sent by the network device through the downlink control channel.

Alternatively, the communication unit is specifically configured to receive the fourth indication information through a second reserved resource in the downlink control channel; or the communication unit is specifically configured to determine a second preset format and take information in the second preset format in the downlink control channel as the fourth indication information; or the communication unit is specifically configured to determine a second preset RNTI and take information containing the second preset RNTI in the downlink control channel as the fourth indication information.

Alternatively, the resource allocation parameter in each of the N resource allocation parameter sets includes at least one of the following parameters: a transmission periodicity, a receiving periodicity, an uplink power control parameter or a number of HARQ processes.

Alternatively, the communication unit is specifically configured to avoid transmitting the service with a resource allocation parameter set other than the first resource allocation parameter set in a period for transmitting the first service.

Alternatively, the N service types include a basic service type, and a resource allocation parameter set corresponding to the basic service type includes all parameters for periodic-scheduling-based service transmission.

Alternatively, when the first resource allocation parameter set includes part of the parameters for periodic-scheduling-based service transmission, the communication unit is specifically configured to transmit the first service with the first resource allocation parameter set, the resource allocation parameter set corresponding to the basic service type, and the first target resource.

Alternatively, the communication unit is specifically configured to receive n configuration information carrying the N resource allocation parameter sets from the network device. Here, each piece of configuration information carries at least one of the N resource allocation parameter sets, N is no less than n, and n is no less than 1.

The service transmission apparatus 800 according to the embodiment of the disclosure may correspond to a first MS (for example, a MS #A) in the method in the embodiment of the disclosure, and each unit, i.e., module, in the service transmission apparatus 800 and the abovementioned and other operations and/or functions are intended to implement a corresponding flow of the method 200 in FIG. 2, and will not be elaborated herein for simplicity.

According to the service transmission apparatus in the embodiment of the disclosure, the first MS negotiates with the network device to determine multiple resource allocation parameter sets in advance, the multiple resource allocation parameter sets correspond to multiple SPS manners respectively, and when the first MS and the network device are required to transmit the first service, the first MS and the network device may determine the first resource allocation parameter set corresponding to the service type of the first service from the multiple (N) resource allocation parameter sets according to the service type of the first service and transmit the first service according to the first resource allocation parameter set, so as to flexibly and rapidly deal with different requirements of different services on SPS.

Figure 9:
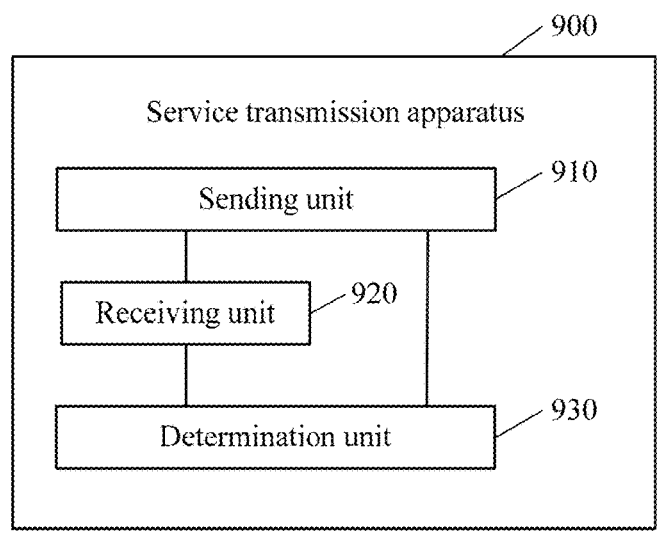
FIG. 9 illustrates a schematic block diagram of another example of a service transmission apparatus according to an embodiment of the disclosure.

FIG. 9 illustrates a schematic block diagram of a service transmission apparatus 900 according to an embodiment of the disclosure. As illustrated in FIG. 9, the apparatus 900 includes a sending unit 910, a receiving unit 920, and a determination unit 930.

The sending unit 910 is configured to issue N resource allocation parameter sets to a first MS. Here, each of the N resource allocation parameter sets includes at least one resource allocation parameter, and N is no less than 2.

The receiving unit 920 is configured to receive first indication information sent by the first MS. Here, the first indication information indicates a service type of a first service to be transmitted by the first MS.

The determination unit 930 is configured to determine a first resource allocation parameter set corresponding to the service type of the first service from the N resource allocation parameter sets according to the first indication information, and configured to determine a first target resource.

The sending unit 910 is further configured to send second indication information indicating the first target resource to the first MS.

Alternatively, the determination unit is specifically configured to determine the first target resource according to the first resource allocation parameter set.

Alternatively, the sending unit is specifically configured to transmit a mapping between the N resource allocation parameter sets and M service types to the first MS, where M is no less than N, and each of the M service types is mapped to one resource allocation parameter set.

Alternatively, the sending unit is further configured to send third indication information to the first MS. Here, the third indication information indicates the first MS to transmit the first service using the first resource allocation parameter set.

Alternatively, the sending unit is specifically configured to send the third indication information to the first MS through a downlink control channel.

Alternatively, the sending unit is specifically configured to send the third indication information to the first MS through a first reserved resource in the downlink control channel.

Or, the sending unit is specifically configured to determine a first preset format and generate and send the third indication information according to the first preset format.

Or, the sending unit is specifically configured to determine a first preset RNTI and contain the first preset RNTI in the third indication information for sending to the first MS.

Alternatively, the sending unit is specifically configured to transmit a one-to-one mapping between the N resource allocation parameter sets and N index identifiers to the first MS, and the third indication information includes the index identifier corresponding to the first resource allocation parameter set.

Alternatively, the index identifier includes a number or an RNTI.

Alternatively, the receiving unit is further configured to acquire T service types which are supported by the first MS from the first MS; and the determination unit is specifically configured to determine the N resource allocation parameter sets according to the T service types, where T is no less than N, and each of the T service types is mapped to one resource allocation parameter set.

Alternatively, the receiving unit is specifically configured to acquire the T service types, which are supported by the first MS, reported by the first MS through AS signaling; or the receiving unit is specifically configured to acquire the T service types which are supported by the first MS through an MME, the T service types which are supported by the first MS are reported to the MME by the first MS through NAS signaling.

Alternatively, the receiving unit is specifically configured to receive the first indication information sent by the first MS through an uplink data channel, where the first indication information is carried in a MAC layer of a data packet.

Or, the receiving unit is specifically configured to receive the first indication information sent by the first MS through an uplink control channel.

Or the receiving unit is specifically configured to receive the first indication information sent by the first MS through RRC signaling.

Alternatively, the sending unit is further configured to send fourth indication information to the first MS. Here, the fourth indication information indicates the first MS to stop transmitting the service with the first resource allocation parameter set.

Alternatively, the resource allocation parameter in each of the N resource allocation parameter sets includes at least one of the following parameters: a transmission periodicity, a receiving periodicity, an uplink power control parameter, or a number of HARQ processes.

Alternatively, the sending unit is specifically configured to send n configuration information carrying the N resource allocation parameter sets to the first MS. Here, each piece of configuration information carries at least one of the N resource allocation parameter sets, N is no less than n, and n is no less than 1.

Alternatively, the determination unit is further configured to acquire information of a second mapping relationship. Here, the information of the second mapping relationship indicates a service type of each of multiple services, the second mapping relationship is the same as a first mapping relationship, and information of the first mapping relationship is used when the first MS determines the service type of each of the multiple services.

The service transmission apparatus 900 according to the embodiment of the disclosure may correspond to a network device (for example, a network device #A) in the method of the embodiment of the disclosure, and each unit, i.e., module, in the service transmission apparatus 900 and the abovementioned and other operations and/or functions are intended to implement a corresponding flow of the method 600 in FIG. 6, and will not be elaborated herein for simplicity.

According to the service transmission apparatus in the embodiment of the disclosure, the first MS negotiates with the network device to determine multiple resource allocation parameter sets in advance, the multiple resource allocation parameter sets correspond to multiple SPS manners respectively, and when the first MS and the network device are required to transmit the first service, the first MS and the network device may determine the first resource allocation parameter set corresponding to the service type of the first service from the multiple (N) resource allocation parameter sets according to the service type of the first service and transmit the first service according to the first resource allocation parameter set, so as to flexibly and rapidly deal with different requirements of different services on SPS.

Figure 10:
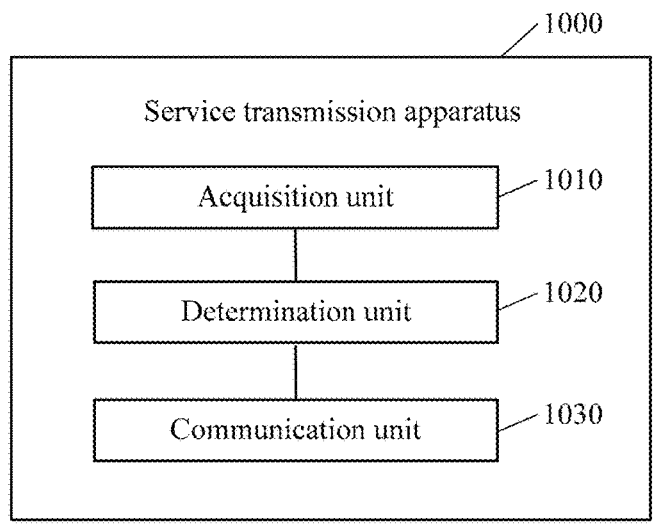
FIG. 10 illustrates a schematic block diagram of another example of a service transmission apparatus according to an embodiment of the disclosure.

FIG. 10 illustrates a schematic block diagram of a service transmission apparatus 1000 according to an embodiment of the disclosure. As illustrated in FIG. 10, the apparatus 1000 includes an acquisition unit 1010, a determination unit 1020, and a communication unit 1030.

The acquisition unit 1010 is configured to acquire a mapping between N resource allocation parameter sets and M service types. Here, each of the N resource allocation parameter sets includes at least one resource allocation parameter, each service type is mapped to one resource allocation parameter set, and M is no less than N is no less than 2.

The determination unit 1020 is configured to determine a second resource allocation parameter set corresponding to a service type of a second service from the N resource allocation parameter sets according to the mapping between the N resource allocation parameter sets and the M service types and the service type of the second service, and determine a second target resource.

The communication unit 1030 is configured to send indication information of the second resource allocation parameter set and indication information of the second target resource to a second MS and transmit the second service with the second MS using the second target resource according to the second resource allocation parameter set.

Alternatively, the determination unit is specifically configured to determine the second target resource according to the second resource allocation parameter set.

Alternatively, the mapping between the N resource allocation parameter sets and the M service types is preset in the apparatus.

Alternatively, the acquisition unit is specifically configured to acquire the mapping between the N resource allocation parameter sets and the M service types from a network device.

Alternatively, the communication unit is further configured to report T service types which are supported by the apparatus to the network device, so as for the network device to determine and issue the mapping between the N resource allocation parameter sets and the M service types to the MS according to the T service types, where T is no less than N, and each of the T service types is mapped to one resource allocation parameter set.

Alternatively, the acquisition unit is further configured to acquire information of a first mapping relationship. Here, the information of the first mapping relationship indicates a service type of each of multiple services, the first mapping relationship is the same as a second mapping relationship, and information of the second mapping relationship is used when the network device determines the service type of each of the multiple services; and the determination unit is further configured to determine the T service types corresponding to K services which are supported by the apparatus according to the information of the first mapping relationship, where K is no less than T.

Alternatively, the communication unit is specifically configured to report the T service types which are supported by the apparatus to the network device through AS signaling.

Or, the communication unit is specifically configured to report the T service types which are supported by the apparatus to the network device by an MME through NAS signaling.

Alternatively, the resource allocation parameter in each of the N resource allocation parameter sets includes at least one of the following parameters: a transmission periodicity, a receiving periodicity, an uplink power control parameter, or a number of HARQ processes.

Alternatively, the communication unit is specifically configured to avoid transmitting the service with a resource allocation parameter set other than the second resource allocation parameter set in a period for transmitting the second service.

Alternatively, the N service types include a basic service type, a resource allocation parameter set corresponding to the basic service type includes all parameters for SPS-based data transmission, the resource allocation parameter set corresponding to the basic service type is stored in the second MS, and when the second resource allocation parameter set includes part of the parameters for periodic-scheduling-based service transmission, the communication unit is specifically configured to transmit the second service with the second MS with the second resource allocation parameter set, the resource allocation parameter set corresponding to the basic service type, and the second target resource.

The service transmission apparatus 1000 according to the embodiment of the disclosure may correspond to a first MS (for example, a MS #B) in the method of the embodiment of the disclosure, and each unit, i.e., module, in the service transmission apparatus 1000 and the abovementioned and other operations and/or functions are intended to implement a corresponding flow of the method 400 in FIG. 4, and will not be elaborated herein for simplicity.

According to the service transmission apparatus in the embodiment of the disclosure, the first MS determines multiple resource allocation parameter sets by negotiation in advance, the multiple resource allocation parameter sets correspond to multiple SPS manners respectively, and when the first MS and the second MS are required to transmit the second service, the first MS may determine the second resource allocation parameter set corresponding to the service type of the second service from the multiple (N) resource allocation parameter sets according to the service type of the second service and transmit the second service with the second MS according to the second resource allocation parameter set, so as to flexibly and rapidly deal with different requirements of different services on SPS.

Figure 11:
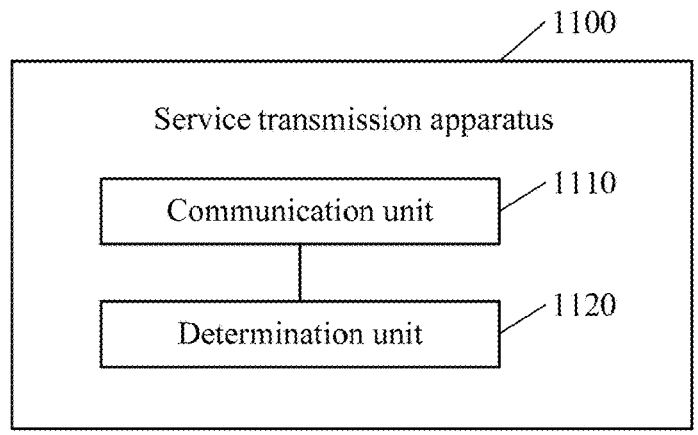
FIG. 11 illustrates a schematic block diagram of another example of a service transmission apparatus according to an embodiment of the disclosure.

FIG. 11 illustrates a schematic block diagram of a service transmission apparatus 1100 according to an embodiment of the disclosure. As illustrated in FIG. 11, the apparatus 1100 includes a communication unit 1110 and a determination unit 1120.

The communication unit 1110 is configured to receive indication information of a second resource allocation parameter set and indication information of a second target resource from a first MS. The second resource allocation parameter set corresponding to a service type of a second service and the second resource allocation parameter set is determined from N resource allocation parameter sets by the first MS according to a mapping between the N resource allocation parameter sets and M service types and a service type of the second service.

The determination unit 1120 is configured to determine the second resource allocation parameter set according to the indication information of the second resource allocation parameter set and determine the second target resource according to the indication information of the second target resource.

The communication unit 1110 is further configured to transmit the second service with the first MS using the second target resource according to the second resource allocation parameter set.

Alternatively, the second target resource is determined by the first MS according to the second resource allocation parameter set.

Alternatively, a resource allocation parameter in each of the N resource allocation parameter sets includes at least one of the following parameters: a transmission periodicity, a receiving periodicity, an uplink power control parameter, or a number of HARQ processes.

Alternatively, the communication unit is further configured to avoid transmitting the service with a resource allocation parameter set other than the second resource allocation parameter set in a period for transmitting the second service.

Alternatively, N service types include a basic service type, a resource allocation parameter set corresponding to the basic service type includes all parameters for SPS-based data transmission, the resource allocation parameter set corresponding to the basic service type is stored in the second MS, and when the second resource allocation parameter set includes part of the parameters for periodic-scheduling-based service transmission, the communication unit is specifically configured to transmit the second service with the first MS with the second resource allocation parameter set, the resource allocation parameter set corresponding to the basic service type, and the second target resource.

The service transmission apparatus 1100 according to the embodiment of the disclosure may correspond to a second MS (for example, a MS #C) in the method of the embodiment of the disclosure, and each unit, i.e., module, in the service transmission apparatus 1100 and the abovementioned and other operations and/or functions are intended to implement a corresponding flow of the method 700 in FIG. 7, and will not be elaborated herein for simplicity.

According to the service transmission apparatus in the embodiment of the disclosure, the first MS determines multiple resource allocation parameter sets by negotiation in advance, the multiple resource allocation parameter sets corresponding to multiple SPS manners respectively, and when the first MS and the second MS are required to transmit the second service, the first MS may determine the second resource allocation parameter set corresponding to the service type of the second service from the multiple (N) resource allocation parameter sets according to the service type of the second service and transmit the second service with the second MS according to the second resource allocation parameter set, so as to flexibly and rapidly deal with different requirements of different services on SPS.

Figure 12:
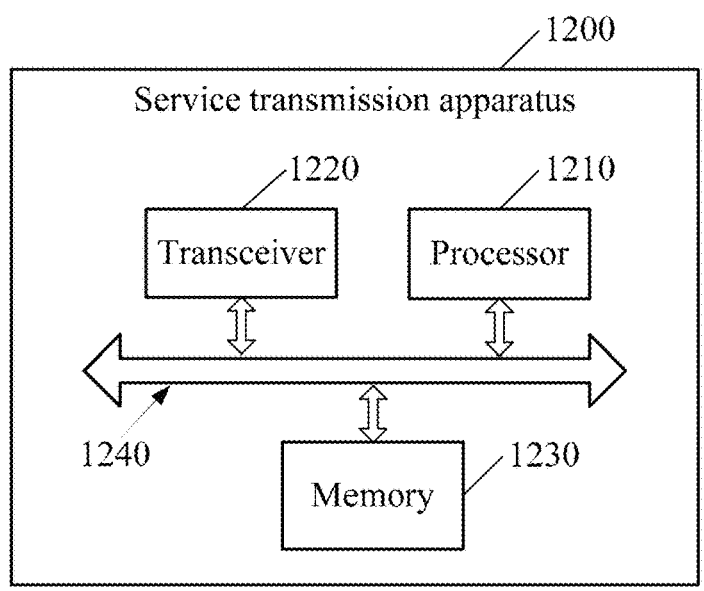
FIG. 12 illustrates a schematic structure diagram of an example of a service transmission apparatus according to an embodiment of the disclosure.

FIG. 12 illustrates a schematic block diagram of a service transmission apparatus 1200 according to an embodiment of the disclosure. As illustrated in FIG. 12, the apparatus 1200 includes a processor 1210 and a transceiver 1220.

The processor 1210 is connected with the transceiver 1220. Alternatively, the apparatus 1200 further includes a memory 1230, and the memory 1230 is connected with the processor 1210. Furthermore, the apparatus 1200 may include a bus system 1240, the processor 1210, the memory 1230 and the transceiver 1220 may be connected through the bus system 1240, the memory 1230 may be configured to store instructions, and the processor 1210 is configured to execute the instructions stored in the memory 1230 to control the transceiver 1220 to acquire N resource allocation parameter sets from a network device, each of the N resource allocation parameter sets includes at least one resource allocation parameter and N is no less than 2.

The processor 1210 is configured to control the transceiver 1220 to send first indication information to the network device, the first indication information indicates a service type of a first service to be transmitted by the apparatus, so as for the network device to determine a first resource allocation parameter set corresponding to the service type of the first service from the N resource allocation parameter sets, to receive second indication information sent by the network device, the second indication information indicates a first target resource.

The processor 1210 is configured to determine the first resource allocation parameter set corresponding to the service type of the first service from the N resource allocation parameter sets.

In addition, the processor 1210 is configured to control the transceiver 1220 to transmit the first service using the first target resource according to the first resource allocation parameter set.

Alternatively, the first target resource is allocated to the apparatus by the network device according to the first resource allocation parameter set.

Alternatively, the processor 1210 is specifically configured to control the transceiver 1220 to acquire a mapping between the N resource allocation parameter sets and M service types from the network device, where M is no less than N, and each of the M service types is mapped to one resource allocation parameter set.

The processor 1210 is specifically configured to determine the first resource allocation parameter set from the N resource allocation parameter sets according to the mapping between the N resource allocation parameter sets and the M service types, and the service type of the first service.

Alternatively, the processor 1210 is specifically configured to control the transceiver 1220 to receive third indication information sent by the network device. Here, the third indication information indicates the apparatus to transmit the first service using the first resource allocation parameter set.

The processor 1210 is specifically configured to determine the first resource allocation parameter set from the N resource allocation parameter sets according to the third indication information.

Alternatively, the processor 1210 is specifically configured to control the transceiver 1220 to receive the third indication information sent by the network device through a downlink control channel.

Alternatively, the processor 1210 is specifically configured to control the transceiver 1220 to receive the third indication information through a first reserved resource in the downlink control channel.

Or, the processor 1210 is specifically configured to determine a first preset format and take information in the first preset format in the downlink control channel as the third indication information.

Or, the processor 1210 is specifically configured to determine a first preset RNTI and take information containing the first preset RNTI in the downlink control channel as the third indication information.

Alternatively, the processor 1210 is specifically configured to control the transceiver 1220 to acquire a one-to-one mapping between the N resource allocation parameter sets and N index identifiers from the network device. Here, the third indication information including the index identifier corresponding to the first resource allocation parameter set.

Alternatively, the index identifier includes a number or an RNTI.

Alternatively, the processor 1210 is specifically configured to control the transceiver 1220 to report T service types which are supported by the apparatus to the network device, so as for the network device to determine and issue the N resource allocation parameter sets to the MS according to the T service types, where T is no less than N, and each of the T service types is mapped to one resource allocation parameter set.

Alternatively, the processor 1210 is specifically configured to acquire information of a first mapping relationship. The information of the first mapping relationship indicates a service type of each of multiple services, the first mapping relationship is the same as a second mapping relationship, and information of the second mapping relationship is information used when the network device determines the service type of each of the multiple services.

In addition, the processor 1210 is configured to determine the T service types corresponding to K services which are supported by the apparatus according to the information of the first mapping relationship, where K is no less than T.

Alternatively, the processor 1210 is specifically configured to control the transceiver 1220 to report the T service types which are supported by the apparatus to the network device through AS signaling.

Or, the processor 1210 is specifically configured to control the transceiver 1220 to report the T service types which are supported by the apparatus to the network device by an MME through NAS signaling.

Alternatively, the processor 1210 is specifically configured to control the transceiver 1220 to send a data packet containing the first indication information to the network device through an uplink data channel. Here, the first indication information is carried in a MAC layer of the data packet.

Or, the processor 1210 is specifically configured to control the transceiver 1220 to send the first indication information to the network device through an uplink control channel.

Or, the processor 1210 is specifically configured to control the transceiver 1220 to send the first indication information to the network device through RRC signaling.

Alternatively, the processor 1210 is further configured to control the transceiver 1220 to receive fourth indication information sent by the network device. Here, the fourth indication information indicates the apparatus to stop transmitting the service with the first resource allocation parameter set. In addition, the processor 1210 is configured to stop transmitting the service with the first resource allocation parameter set according to the fourth indication information.

Alternatively, the processor 1210 is specifically configured to control the transceiver 1220 to receive the fourth indication information sent by the network device through the downlink control channel.

Alternatively, the processor 1210 is specifically configured to control the transceiver 1220 to receive the fourth indication information through a second reserved resource in the downlink control channel.

Or, the processor 1210 is specifically configured to determine a second preset format and take information in the second preset format in the downlink control channel as the fourth indication information.

Or, the processor 1210 is specifically configured to determine a second preset RNTI and take information containing the second preset RNTI in the downlink control channel as the fourth indication information.

Alternatively, the resource allocation parameter in each of the N resource allocation parameter sets includes at least one of the following parameters: a transmission periodicity, a receiving periodicity, an uplink power control parameter, or a number of HARQ processes.

Alternatively, the processor 1210 is specifically configured to control the transceiver 1220 to avoid transmitting the service with a resource allocation parameter set other than the first resource allocation parameter set in a period for transmitting the first service.

Alternatively, the N service types include a basic service type, and a resource allocation parameter set corresponding to the basic service type includes all parameters for periodic-scheduling-based service transmission.

Alternatively, when the first resource allocation parameter set includes part of the parameters for periodic-scheduling-based service transmission, the processor 1210 is specifically configured to control the transceiver 1220 to transmit the first service with the first resource allocation parameter set, the resource allocation parameter set corresponding to the basic service type, and the first target resource.

Alternatively, the processor 1210 is specifically configured to control the transceiver 1220 to receive n configuration information carrying the N resource allocation parameter sets from the network device. Here, each piece of configuration information carries at least one of the N resource allocation parameter sets, N is no less than n, and n is no less than 1.

The service transmission apparatus 1200 according to the embodiment of the disclosure may correspond to a first MS (for example, a MS #A) in the method of the embodiment of the disclosure, and each unit, i.e., module, in the service transmission apparatus 1200 and the abovementioned and other operations and/or functions are intended to implement a corresponding flow of the method 200 in FIG. 2, and will not be elaborated herein for simplicity.

According to the service transmission apparatus in the embodiment of the disclosure, the first MS negotiates with the network device to determine multiple resource allocation parameter sets in advance, the multiple resource allocation parameter sets correspond to multiple SPS manners respectively, and when the first MS and the network device are required to transmit the first service, the first MS and the network device may determine the first resource allocation parameter set corresponding to the service type of the first service from the multiple (N) resource allocation parameter sets according to the service type of the first service and transmit the first service according to the first resource allocation parameter set, so as to flexibly and rapidly deal with different requirements of different services on SPS.

Figure 13:
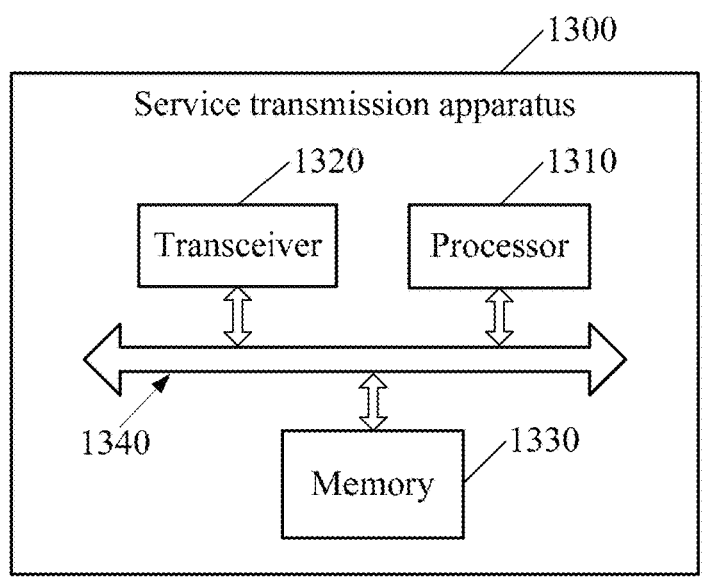
FIG. 13 illustrates a schematic structure diagram of another example of a service transmission apparatus according to an embodiment of the disclosure.

FIG. 13 illustrates a schematic block diagram of a service transmission apparatus 1300 according to an embodiment of the disclosure. As illustrated in FIG. 13, the apparatus 1300 includes: a processor 1310 and a transceiver 1320, and the processor 1310 is connected with the transceiver 1320. Alternatively, the apparatus 1300 further includes a memory 1330, and the memory 1330 is connected with the processor 1310. Furthermore, the apparatus 1300 may include a bus system 1340, the processor 1310, the memory 1330 and the transceiver 1320 may be connected through the bus system 1340, the memory 1330 may be configured to store instructions, and the processor 1310 is configured to execute the instructions stored in the memory 1330 to control the transceiver 1320 to issue N resource allocation parameter sets to a first MS, each of the N resource allocation parameter sets including at least one resource allocation parameter and N is no less than 2.

The processor 1310 is configured to control the transceiver 1320 to receive first indication information sent by the first MS, the first indication information indicates a service type of a first service to be transmitted by the first MS.

The processor 1310 is configured to determine a first resource allocation parameter set corresponding to the service type of the first service from the N resource allocation parameter sets according to the first indication information, and determine a first target resource.

In addition, the processor 1310 is configured to control the transceiver 1320 to send second indication information indicating the first target resource to the first MS.

Alternatively, the processor 1310 is specifically configured to determine the first target resource according to the first resource allocation parameter set.

Alternatively, the processor 1310 is specifically configured to control the transceiver 1320 to transmit a mapping between the N resource allocation parameter sets and M service types to the first MS, wherein M is no less than N, and each of the M service types is mapped to one resource allocation parameter set.

Alternatively, the processor 1310 is specifically configured to control the transceiver 1320 to send third indication information to the first MS. The third indication information indicates the first MS to transmit the first service using the first resource allocation parameter set.

Alternatively, the processor 1310 is specifically configured to control the transceiver 1320 to send the third indication information to the first MS through a downlink control channel.

Alternatively, the processor 1310 is specifically configured to control the transceiver 1320 to send the third indication information to the first MS through a first reserved resource in the downlink control channel.

Or, the processor 1310 is specifically configured to determine a first preset format and generate and send the third indication information according to the first preset format.

Or, the processor 1310 is specifically configured to determine a first preset RNTI and contain the first preset RNTI in the third indication information for sending to the first MS. Alternatively, the processor 1310 is specifically configured to control the transceiver 1320 to transmit a one-to-one mapping between the N resource allocation parameter sets and N index identifiers to the first MS. Here, the third indication information includes an index identifier corresponding to the first resource allocation parameter set.

Alternatively, the index identifier includes a number or an RNTI.

Alternatively, the processor 1310 is specifically configured to control the transceiver 1320 to acquire T service types which are supported by the first MS from the first MS.

The processor 1310 is specifically configured to determine the N resource allocation parameter sets according to the T service types, where T is no less than N, and each of the T service types is mapped to one resource allocation parameter set.

Alternatively, the processor 1310 is specifically configured to control the transceiver 1320 to acquire the T service types, which are supported by the first MS, reported by the first MS through AS signaling.

Or, the processor 1310 is specifically configured to control the transceiver 1320 to acquire the T service types which are supported by the first MS through an MME, the T service types which are supported by the first MS being reported to the MME by the first MS through NAS signaling.

Alternatively, the processor 1310 is specifically configured to control the transceiver 1320 to receive the first indication information sent by the first MS through an uplink data channel, where the first indication information is carried in a MAC layer of a data packet.

Or, the processor 1310 is specifically configured to control the transceiver 1320 to receive the first indication information sent by the first MS through an uplink control channel.

Or, the processor 1310 is specifically configured to control the transceiver 1320 to receive the first indication information sent by the first MS through RRC signaling.

Alternatively, the processor 1310 is specifically configured to control the transceiver 1320 to send fourth indication information to the first MS, the fourth indication information indicates the first MS to stop transmitting the service with the first resource allocation parameter set.

Alternatively, the resource allocation parameter in each of the N resource allocation parameter sets includes at least one of the following parameters: a transmission periodicity, a receiving periodicity, an uplink power control parameter, or a number of HARQ processes.

Alternatively, the processor 1310 is specifically configured to control the transceiver 1320 to send n configuration information carrying the N resource allocation parameter sets to the first MS. Here, each piece of configuration information carries at least one of the N resource allocation parameter sets, N is no less than n, and n is no less than 1.

Alternatively, the processor 1310 is specifically configured to acquire information of a second mapping relationship. Here, the information of the second mapping relationship indicates a service type of each of multiple services, the second mapping relationship is the same as a first mapping relationship, and information of the first mapping relationship is used when the first MS determines the service type of each of the multiple services.

The service transmission apparatus 1300 according to the embodiment of the disclosure may correspond to a network device (for example, a network device #A) in the method of the embodiment of the disclosure, and each unit, i.e., module, in the service transmission apparatus 1300 and the abovementioned and other operations and/or functions are intended to implement a corresponding flow of the method 600 in FIG. 6, and will not be elaborated herein for simplicity.

According to the service transmission apparatus in the embodiment of the disclosure, the first MS negotiates with the network device to determine multiple resource allocation parameter sets in advance, the multiple resource allocation parameter sets corresponding to multiple SPS manners respectively, and when the first MS and the network device are required to transmit the first service, the first MS and the network device may determine the first resource allocation parameter set corresponding to the service type of the first service from the multiple (N) resource allocation parameter sets according to the service type of the first service and transmit the first service according to the first resource allocation parameter set, so as to flexibly and rapidly deal with different requirements of different services on SPS.

Figure 14:
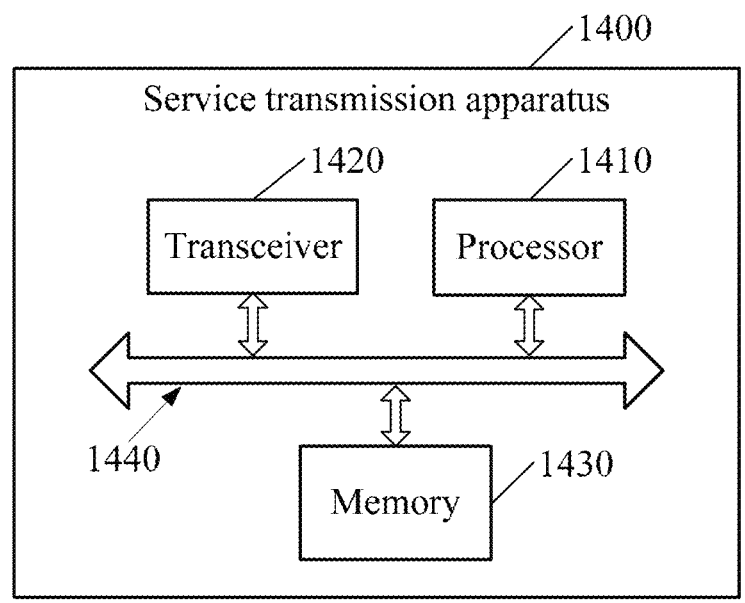
FIG. 14 illustrates a schematic structure diagram of another example of a service transmission apparatus according to an embodiment of the disclosure.

FIG. 14 illustrates a schematic block diagram of a service transmission apparatus 1400 according to an embodiment of the disclosure. As illustrated in FIG. 14, the apparatus 1400 includes: a processor 1410 and a transceiver 1420, and the processor 1410 is connected with the transceiver 1420. Alternatively, the apparatus 1400 further includes a memory 1430, and the memory 1430 is connected with the processor 1410. Furthermore, the apparatus 1400 Alternatively includes a bus system 1440, wherein the processor 1410, the memory 1430 and the transceiver 1420 may be connected through the bus system 1440, the memory 1430 may be configured to store an instruction, and the processor 1410 is configured to execute the instruction stored in the memory 1430 to control the transceiver 1420 to acquire a mapping between N resource allocation parameter sets and M service types, each of the N resource allocation parameter sets including at least one resource allocation parameter, each service type corresponding to a resource allocation parameter set and M is no less than N is no less than 2, The processor 1410 is configured to determine a second resource allocation parameter set corresponding to a service type of a second service from the N resource allocation parameter sets according to the mapping between the N resource allocation parameter sets and the M service types, and the service type of the second service, and determine a second target resource.

In addition, the processor 1410 is configured to control the transceiver 1420 to send indication information of the second resource allocation parameter set and indication information of the second target resource to a second MS and transmit the second service with the second MS using the second target resource according to the second resource allocation parameter set.

Alternatively, the processor 1410 is specifically configured to determine the second target resource according to the second resource allocation parameter set.

Alternatively, the mapping between the N resource allocation parameter sets and the M service types is preset in the apparatus 1400.

Alternatively, the processor 1410 is specifically configured to control the transceiver 1420 to acquire the mapping between the N resource allocation parameter sets and the M service types from a network device.

Alternatively, the processor 1410 is specifically configured to control the transceiver 1420 to report T service types which are supported by the apparatus to the network device, so as for the network device to determine and issue the mapping between the N resource allocation parameter sets and the M service types to the MS according to the T service types, where T is no less than N, and each of the T service types is mapped to one resource allocation parameter set.

Alternatively, the processor 1410 is specifically configured to acquire information of a first mapping relationship, the information of the first mapping relationship being configured to indicate a service type of each of multiple services. Here, the first mapping relationship is the same as a second mapping relationship and information of the second mapping relationship is information used when the network device determines the service type of each of the multiple services, and the processor 1410 is configured to determine the T service types corresponding to K services which are supported by the apparatus according to the information of the first mapping relationship, where K is no less than T.

Alternatively, the processor 1410 is specifically configured to control the transceiver 1420 to report the T service types which are supported by the apparatus to the network device through AS signaling.

Or, the processor 1410 is specifically configured to control the transceiver 1420 to report the T service types which are supported by the apparatus to the network device by an MME through NAS signaling.

Alternatively, the resource allocation parameter in each of the N resource allocation parameter sets includes at least one of the following parameters: a transmission periodicity, a receiving periodicity, an uplink power control parameter, or a number of HARQ processes.

Alternatively, the processor 1410 is specifically configured to control the transceiver 1420 to avoid transmitting the service with a resource allocation parameter set except the second resource allocation parameter set in a period for transmitting the second service.

Alternatively, the N service types include a basic service type, a resource allocation parameter set corresponding to the basic service type includes all parameters for SPS-based data transmission, the resource allocation parameter set corresponding to the basic service type is stored in the second MS; and when the second resource allocation parameter set includes part of the parameters for periodic-scheduling-based service transmission, the processor 1410 is specifically configured to control the transceiver 1420 to transmit the second service with the second MS with the second resource allocation parameter set, the resource allocation parameter set corresponding to the basic service type, and the second target resource.

The service transmission apparatus 1400 according to the embodiment of the disclosure may correspond to a first MS (for example, a MS #B) in the method of the embodiment of the disclosure, and each unit, i.e., module, in the service transmission apparatus 1400 and the abovementioned and other operations and/or functions are intended to implement a corresponding flow of the method 400 in FIG. 4, and will not be elaborated herein for simplicity.

According to the service transmission apparatus in the embodiment of the disclosure, the first MS determines multiple resource allocation parameter sets by negotiation in advance, the multiple resource allocation parameter sets correspond to multiple SPS manners respectively, and when the first MS and the second MS are required to transmit the second service, the first MS may determine the second resource allocation parameter set corresponding to the service type of the second service from the multiple (N) resource allocation parameter sets according to the service type of the second service and transmit the second service with the second MS according to the second resource allocation parameter set, so as to flexibly and rapidly deal with different requirements of different services on SPS.

Figure 15:
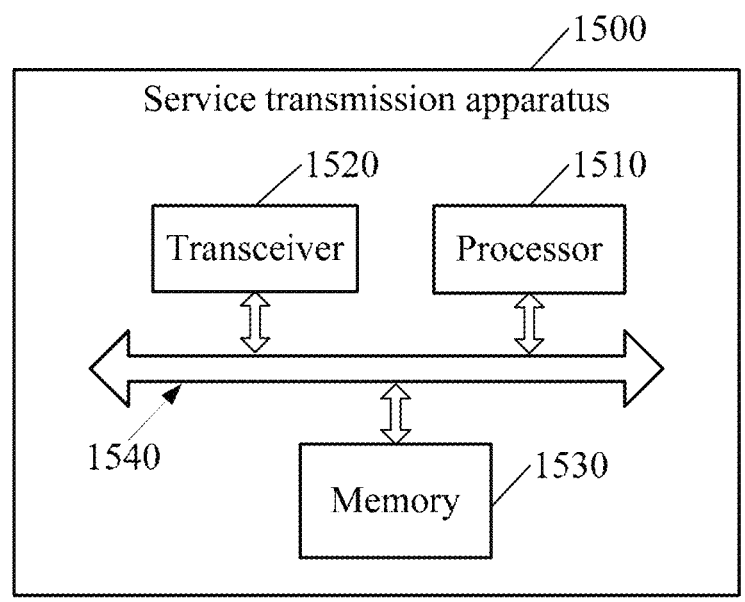
FIG. 15 illustrates a schematic structure diagram of another example of a service transmission apparatus according to an embodiment of the disclosure.

FIG. 15 illustrates a schematic block diagram of a service transmission apparatus 1500 according to an embodiment of the disclosure. As illustrated in FIG. 15, the apparatus 1500 includes: a processor 1510 and a transceiver 1520, and the processor 1510 is connected with the transceiver 1520. Alternatively, the apparatus 1500 may further include a memory 1530, and the memory 1530 is connected with the processor 1510. Alternatively, the apparatus 1500 may further include a bus system 1540, the processor 1510, the memory 1530 and the transceiver 1520 may be connected through the bus system 1540, the memory 1530 may be configured to store instructions, and the processor 1510 is configured to execute the instructions stored in the memory 1530 to control the transceiver 1520 to receive indication information of a second resource allocation parameter set and indication information of a second target resource from a first MS. Here, the second resource allocation parameter set is determined by the first MS from N resource allocation parameter sets according to a mapping between the N resource allocation parameter sets and M service types, and a service type of the second service.

The processor 1510 is configured to determine the second resource allocation parameter set according to the indication information of the second resource allocation parameter set, and determine the second target resource according to the indication information of the second target resource.

The processor 1510 is configured to control the transceiver 1520 to transmit, according to the second resource allocation parameter set, the second service with the first MS using the second target resource.

Alternatively, the second target resource is determined by the first MS according to the second resource allocation parameter set.

Alternatively, a resource allocation parameter in each of the N resource allocation parameter sets includes at least one of the following parameters: a transmission periodicity, a receiving periodicity, an uplink power control parameter, or a number of HARQ processes.

Alternatively, the processor 1510 is specifically configured to control the transceiver 1520 to avoid transmitting the service with a resource allocation parameter set other than the second resource allocation parameter set in a period for transmitting the second service.

Alternatively, N service types include a basic service type, a resource allocation parameter set corresponding to the basic service type includes all parameters for SPS-based data transmission, the resource allocation parameter set corresponding to the basic service type is stored in the second MS; and when the second resource allocation parameter set includes part of the parameters for periodic-scheduling-based service transmission, the processor 1510 is specifically configured to control the transceiver 1520 to transmit the second service with the first MS with the second resource allocation parameter set, the resource allocation parameter set corresponding to the basic service type, and the second target resource.

The service transmission apparatus 1500 according to the embodiment of the disclosure may correspond to a second MS (for example, a MS #C) in the method of the embodiment of the disclosure, and each unit, i.e., module, in the service transmission apparatus 1500 and the abovementioned and other operations and/or functions are intended to implement a corresponding flow of the method 700 in FIG. 7, and will not be elaborated herein for simplicity.

According to the service transmission apparatus in the embodiment of the disclosure, the first MS determines multiple resource allocation parameter sets by negotiation in advance, the multiple resource allocation parameter sets correspond to multiple SPS manners respectively, and when the first MS and the second MS are required to transmit the second service, the first MS may determine the second resource allocation parameter set corresponding to the service type of the second service from the multiple (N) resource allocation parameter sets according to the service type of the second service and transmit the second service with the second MS according to the second resource allocation parameter set, so as to flexibly and rapidly deal with different requirements of different services on SPS.

It is to be understood that, in the embodiment of the disclosure, the processor may be a Central Processing Unit (CPU), and the processor may be another universal processor, a Digital Signal Processor (DSP), an Application Specific Integrated Circuit (ASIC), a Field Programmable Gate Array (FPGA) or another programmable logical device, discrete gate or transistor logical device and discrete hardware component, etc. The universal processor may be a microprocessor or the processor may also be any conventional processor and the like.

The memory may include a Read-Only Memory (ROM) and a Random Access Memory (RAM), and provides instructions and data for the processor. A part of the memory may further include a nonvolatile RAM. For example, the memory may further store information of a device type.

The bus system includes a data bus, and further includes a power bus, a control bus, a state signal bus and the like. However, for clear description, various buses are marked as the bus system in the figures.

In an implementation process, each step of the method may be completed by an integrated logical circuit of hardware in the processor or an instruction in a software form. The operations of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory, and the processor reads information in the memory, and completes the operations of the method in combination with hardware. For avoiding repetitions, no detailed descriptions will be made herein.

It is to be understood that, in each embodiment of the disclosure, a magnitude of a sequence number of each process does not mean an execution sequence and the execution sequence of each process should be determined by its function and an internal logic and should not form any limit to an implementation process of the embodiments of the disclosure.

Those of ordinary skilled in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application using different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments of the disclosure according to a practical requirement.

In addition, each function unit in each embodiment of the disclosure may be integrated into a processing unit, each unit may also exist independently, and two or more than two units may also be integrated into a unit.

When being implemented in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A service transmission method, comprising:
sending, by a network device, n pieces of configuration information carrying N resource allocation parameter sets to a first Mobile Station (MS), wherein each piece of configuration information carries one N resource allocation parameter set, and the resource parameter set is used for periodic resource scheduling, and n equals to N and N is no less than 2;
receiving, by the network device, a first indication information sent by the first MS, wherein the first indication information is used to indicate a service type of a first service that is to be transmitted;
sending, by the network device, a second indication information to the first MS according to the first indication information, wherein the second indication information is used to indicate a first resource; and
determining, by the network device, a first resource allocation parameter set used to transmit the first service through the first resource, wherein first resource allocation parameter set is one of the N resource allocation parameter sets, and the first resource allocation parameter set is related to the service type of the first service.

2. The method of claim 1, further comprising:
sending, by the network device, a third indication information to the first MS, wherein the third indication information is used to indicate the first resource allocation parameter set.

3. The method of claim 1, wherein the third indication information is sent to the first MS by the network device through a downlink control channel.

4. The method of claim 2, wherein the third indication information is information in a first format in the downlink control channel.

5. The method of claim 2, wherein the third indication information comprises an index identifier corresponding to the first resource allocation parameter set, and the N resource allocation parameter sets have a one-to-one mapping relationship with N index identifiers.

6. The method of claim 5, wherein the index identifier comprises a number.

7. The method of claim 1, further comprising:
sending, by the network device, a fourth indication information to the first MS, wherein the fourth indication information is used to indicate the first MS to stop performing service transmission based on the first resource parameter set.

8. The method of claim 1, wherein the N resource allocation parameter sets correspond to M pieces of service related information, and M is no less than N, and each of the M pieces of related service information corresponds to one resource allocation parameter set.

9. A service transmission apparatus, comprising:
a processor;
a transceiver; and
a memory storing instructions,
wherein the transceiver is configured to send n pieces of configuration information carrying N resource allocation parameter sets to a first Mobile Station (MS), wherein each piece of configuration information carries one N resource allocation parameter set, and the resource parameter set is used for periodic resource scheduling, and n equals to N and N is no less than 2;
wherein the transceiver is further configured to receive a first indication information sent by the first MS, wherein the first indication information is used to indicate a service type of a first service that is to be transmitted;
wherein the processor is further configured to determine a second indication information according to the first indication information, wherein the second indication information is used to indicate a first resource and determine a first resource allocation parameter set used to transmit the first service through the first resource, wherein first resource allocation parameter set is one of the N resource allocation parameter sets, and the first resource allocation parameter set is related to the service type of the first service.

10. The apparatus of claim 9, wherein the transceiver is further configured to send a third indication information to the first MS, wherein the third indication information is used to indicate the first resource allocation parameter set.

11. The apparatus of claim 9, wherein the transceiver is further configured to send the third indication information to the first MS through a downlink control channel.

12. The apparatus of claim 10, wherein the third indication information is information in a first format in the downlink control channel.

13. The apparatus of claim 10, wherein the third indication information comprises an index identifier corresponding to the first resource allocation parameter set, and the N resource allocation parameter sets have a one-to-one mapping relationship with N index identifiers.

14. The apparatus of claim 13, wherein the index identifier comprises a number.

15. The apparatus of claim 9, wherein the transceiver is further configured to send a fourth indication information to the first MS, wherein the fourth indication information is used to indicate the first MS to stop performing service transmission based on the first resource parameter set.

16. The apparatus of claim 9, wherein the N resource allocation parameter sets correspond to M pieces of service related information, and M is no less than N, and each of the M pieces of related service information corresponds to one resource allocation parameter set.

* * * * *